(12) United States Patent
Tsuruta et al.

(10) Patent No.: US 9,956,705 B2
(45) Date of Patent: May 1, 2018

(54) COMPACTOR AND PREPREG SHEET AUTOMATIC LAMINATION DEVICE

(71) Applicant: MITSUBISHI HEAVY INDUSTRIES, LTD., Tokyo (JP)

(72) Inventors: Megumu Tsuruta, Tokyo (JP); Takashi Shibutani, Tokyo (JP); Kentarou Saeki, Tokyo (JP); Yoshitomo Noda, Tokyo (JP); Kosuke Owatari, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days. days.

(21) Appl. No.: 15/115,247

(22) PCT Filed: Jan. 9, 2015

(86) PCT No.: PCT/JP2015/050559
§ 371 (c)(1),
(2) Date: Jul. 28, 2016

(87) PCT Pub. No.: WO2015/118903
PCT Pub. Date: Aug. 13, 2015

(65) Prior Publication Data
US 2017/0001343 A1    Jan. 5, 2017

(30) Foreign Application Priority Data
Feb. 10, 2014    (JP) .................... 2014-023709

(51) Int. Cl.
*B29C 43/36*    (2006.01)
*B29C 43/22*    (2006.01)
(Continued)

(52) U.S. Cl.
CPC .......... *B29C 43/3697* (2013.01); *B29C 43/22* (2013.01); *B29C 70/38* (2013.01);
(Continued)

(58) Field of Classification Search
CPC . B29C 2043/3422; B29C 70/38; B29C 43/22; B29C 43/3697; B29C 70/382;
(Continued)

(56) References Cited

U.S. PATENT DOCUMENTS 5,011,563 A    4/1991    Shinno et al.
5,288,357 A *  2/1994    Yamada .............. B29C 35/0288
                                                      156/249

(Continued)

FOREIGN PATENT DOCUMENTS

JP    58-39845 U    3/1983
JP    1-294165 A    11/1989

(Continued)

OTHER PUBLICATIONS

Extended European Search Report in EP Application No. 15745770.6, dated Jan. 5, 2017.

(Continued)

*Primary Examiner* — Michael A Tolin
*Assistant Examiner* — Jimmy R Smith, Jr.
(74) *Attorney, Agent, or Firm* — Kanesaka Berner and Partners LLP

(57) ABSTRACT

This compactor includes first rollers having first roller surfaces that press a laminated sheet from the second surface side of a release sheet, the first rollers being disposed separated from each other; and a second roller having a second roller surface that presses the laminated sheet from the second surface side of the release sheet, the second roller being disposed such that the second roller surface faces a gap provided between the first rollers.

7 Claims, 19 Drawing Sheets

(51) Int. Cl.
*B29C 70/38* (2006.01)
*B29C 70/50* (2006.01)
*B29K 105/08* (2006.01)
*B29C 43/34* (2006.01)

(52) U.S. Cl.
CPC .... *B29C 70/504* (2013.01); *B29C 2043/3422* (2013.01); *B29K 2105/0863* (2013.01); *B29K 2105/0872* (2013.01)

(58) Field of Classification Search
CPC ............... B29C 70/384; B29C 70/504; B29K 2105/0863; B29K 2105/0872
USPC .......................................... 156/580, 581, 582
See application file for complete search history.

(56) References Cited

U.S. PATENT DOCUMENTS

2012/0186730 A1* 7/2012 Shindo .................... B29C 70/38
156/160
2012/0298309 A1* 11/2012 Arakawa ................ B29C 70/388
156/538
2012/0305175 A1* 12/2012 Wampler .............. B29C 70/386
156/229

FOREIGN PATENT DOCUMENTS

| JP | 4-308733 A | 10/1992 |
| JP | 4-344225 A | 11/1992 |
| JP | 2004-17625 | 1/2004 |
| JP | 2011-177927 A | 9/2011 |
| JP | 2013-28062 A | 2/2013 |
| WO | 2011/078336 A1 | 6/2011 |
| WO | 2013/159137 A2 | 10/2013 |
| WO | 2014/073090 A1 | 5/2014 |

OTHER PUBLICATIONS

International Search Report in PCT Application No. PCT/JP2015/050559, dated Mar. 17, 2015.
Written Opinion in PCT Application No. PCT/JP2015/050559, dated Mar. 17, 2015.

\* cited by examiner

COMPACTOR AND PREPREG SHEET AUTOMATIC LAMINATION DEVICE

TECHNICAL FIELD

The present invention relates to a compactor for pressing a laminated sheet, which includes a release sheet and a semi-cured prepreg sheet attached to a first surface of the release sheet, onto the top surface of a laminate base formed of at least one semi-cured prepreg sheet, from the release sheet side of the laminated sheet, and to a prepreg sheet automatic lamination device including the compactor. This application claims priority based on Japanese Patent Application No. 2014-023709 filed in Japan on Feb. 10, 2014, of which the contents are incorporated herein by reference.

BACKGROUND ART

Conventionally, aircraft fuselages, main wings, and the like are manufactured using completely cured prepreg laminated bodies. The completely cured prepreg laminated bodies are each formed by laminating a plurality of prepreg sheets, each of the prepreg sheets being formed of a fiber sheet impregnated with resin, to form a semi-cured (incompletely cured) prepreg laminated body and then completely curing the semi-cured prepreg laminated body.

The fibers forming the above-described fiber sheet extend in the same fiber direction. Further, an ultraviolet-curable resin, a heat-curable resin, or the like in a semi-cured state (an incompletely cured state) is used as the resin with which the fiber sheet is impregnated. The resin with which the fiber sheet is impregnated has adhesiveness. Therefore, a release sheet is disposed on one surface of the prepreg sheet.

The above-described semi-cured prepreg laminated body is formed using a prepreg sheet automatic lamination device. Specifically, the prepreg sheet automatic lamination device forms the semi-cured prepreg laminated body by removing the release sheet from the semi-cured prepreg sheet and integrally laminating a plurality of the prepreg sheets while causing the fiber directions of the fiber sheets to intersect each other.

At this time, it is not desirable that air (air pockets) remain between the laminated semi-cured prepreg sheets, since the adhesion between the prepreg sheets decreases.

Further, for example, when the above-described semi-cured prepreg laminated bodies in which the air remains are completely cured using heat (in this case, the resin forming the prepreg sheet is a heat-curable resin), the air (the air pockets) expands, which results in a further decrease in the adhesion between the prepreg sheets.

Therefore, conventionally, the presence of the air (the air pockets) has been minimized between the laminated semi-cured prepreg sheets by press-bonding the semi-cured prepreg sheets using a plurality of compactors each having a piston mechanism (part of the constituent components forming the prepreg sheet automatic lamination device) (see Patent Document 1, for example).

FIG. 18 is a side view schematically illustrating a state in which a compactor group including a plurality of conventional compactors each having a piston mechanism presses a laminated sheet formed of a release sheet and a semi-cured prepreg sheet, via a polytetrafluoroethylene (PTFE) sheet.

H in FIG. 18 indicates a movement direction of a compactor 201 (hereinafter referred to as a "direction H"). In FIG. 18, since it is difficult to illustrate a plurality of the compactors 201 disposed in a direction intersecting the direction H, only one of the compactors 201 is illustrated.

Here, a conventional compactor group 200 will be described with reference to FIG. 18.

The conventional compactor group 200 includes the plurality of compactors 201 disposed in the direction intersecting the direction H.

The compactor 201 includes a piston mechanism 202 and a compactor shoe 203.

The piston mechanism 202 includes a shaft 204 configured to reciprocate in the up-down direction. The compactor shoe 203 is provided on a leading end portion of the shaft 204.

The plurality of compactors 201 are disposed such that a plurality of the compactor shoes 203 disposed in the direction intersecting the direction H are disposed in close proximity to each other.

This configuration, in which the plurality of compactors 201 are disposed in close proximity to each other, makes it possible to press the entire surface of the laminated sheet, thereby minimizing the presence of the air (the air pockets) between the laminated semi-cured prepreg sheets.

The plurality of compactor shoes 203 that are constituents of the compactor group 200 press a laminated sheet 209, which is a laminate of a release sheet 207 and a semi-cured prepreg sheet 208, via a PTFE sheet 205 (a sheet for inhibiting the release sheet 207 from attaching to the compactor shoe 203).

In this manner, by pressing the laminated sheet 209 using the plurality of compactor shoes 203, the semi-cured prepreg sheet 208 that is a constituent of the laminated sheet 209 is attached to the top surface of a laminate base 214 (specifically, a structural body formed of at least one semi-cured prepreg sheet to form part of a prepreg laminated body) placed on a stage 212.

CITATION LIST

Patent Document

Patent Document 1: Japanese Unexamined Patent Application Publication No. 2011-177927A

SUMMARY OF INVENTION

Technical Problem

However, when the conventional compactors 201 are used, as a result of the PTFE sheet 205 and the compactor shoes 203 reciprocating in the horizontal direction, abrasion powder is generated due to the abrasion of the PTFE sheet 205 and the compactor shoes 203, and the abrasion powder is sometimes present between the laminated semi-cured prepreg sheets.

An object of the present invention is to provide a compactor capable of minimizing the presence of the abrasion powder between the laminated semi-cured prepreg sheets, and a prepreg sheet automatic lamination device.

Solution to Problem

According to a first aspect of the present invention, a compactor is configured to press a laminated sheet including a release sheet and a semi-cured prepreg sheet attached to a first surface of the release sheet onto a top surface of a laminate base formed of at least one semi-cured prepreg sheet, from a second surface side of the release sheet of the laminated sheet. The compactor includes: a pair of first rollers disposed separated from each other, each of the first rollers having a first roller surface that presses the laminated sheet from the second surface side of the release sheet, and; a second roller having a second roller surface that presses the laminated sheet from the second surface side of the release sheet, the second roller being disposed such that the second roller surface faces a gap provided between the pair of first rollers.

According to a first aspect of the present invention, a compactor is configured to press a laminated sheet including a release sheet and a semi-cured prepreg sheet attached to the first surface of the release sheet onto the top surface of a laminate base formed of at least one semi-cured prepreg sheet, from the second surface side of the release sheet of the laminated sheet. The compactor includes: a pair of first rollers each having a first roller surface that presses the laminated sheet from the second surface side of the release sheet; and a second roller having a second roller surface that presses the laminated sheet from the second surface side of the release sheet, the second roller being disposed such that the second roller surface faces a gap provided between the pair of first rollers (a gap formed as a result of providing a roller retaining portion configured to retain the pair of first rollers, for example). Accordingly, the first and second roller surfaces press the laminated sheet while rotating. As a result, almost no abrasion powder is generated from the first and second rollers.

This makes it possible to minimize the presence of the abrasion powder between the laminated semi-cured prepreg sheets (in other words, a structural body formed of the laminate base and the semi-cured prepreg sheet that is a constituent of the laminated sheet 16).

Further, by disposing the second roller such that the second roller surface faces the gap provided between the pair of first rollers disposed separated from each other, the second roller surface can press portions of the laminated sheet that cannot be pressed by the first roller surfaces, and thus, the entire laminated sheet can be pressed.

According to a second aspect of the present invention, in the compactor according to the first aspect, the second roller may be disposed such that outer peripheral surfaces located on the gap side of the first roller surfaces of the pair of first rollers face the second roller surface.

This configuration, in which the second roller surface faces the outer peripheral surfaces on the gap side of the first roller surfaces, the gap being provided between the pair of first rollers, allows the second roller surface to press portions of the laminated sheet pressed by the outer peripheral surfaces (in this case, the outer peripheral surfaces located on the gap side) of the first rollers, where the pressing force tends to become weaker than the pressing force applied by the surfaces located in the central sections of the first roller surfaces.

This makes it possible to minimize the presence of air (air pockets) in portions of the laminated semi-cured prepreg sheets on which the outer peripheral surfaces of the first rollers have passed.

According to a third aspect of the present invention, in the compactor according to the first aspect or the second aspect, the compactor may include a first rotating shaft configured to rotatably support the pair of first rollers, a second rotating shaft configured to rotatably support the second roller, and a roller retaining portion configured to retain the pair of first rollers and the second roller, via the first and second rotating shafts.

This configuration, in which the first rotating shaft that rotatably supports the pair of first rollers, the second rotating shaft that rotatably supports the second roller, and the roller retaining portion that retains the pair of first rollers and the second roller via the first and second rotating shafts are provided, makes it possible to rotatably retain the pair of first rollers and the second roller, and also maintain a space (a distance) between the pair of first rollers and the second roller to be constant.

According to a fourth aspect of the present invention, in the compactor according to the third aspect, the roller retaining portion may include a first roller retaining portion configured to retain the pair of first rollers, and a second roller retaining portion configured to retain the second roller. Further, the compactor may further include a first pressing mechanism connected to an upper portion of the first roller retaining portion and configured to press the first roller retaining portion, and a second pressing mechanism connected to an upper portion of the second roller retaining portion and configured to press the second roller retaining portion.

This configuration, in which the first pressing mechanism that presses the first roller retaining portion that retains the pair of first rollers, and the second pressing mechanism that presses the second roller retaining portion that retains the second roller are provided, makes it possible to separately control a pressing force to press the pair of first rollers via the first roller retaining portion and a pressing force to press the second roller via the second roller retaining portion.

Accordingly, variations in the pressure applied to press the semi-cured prepreg sheet to be put on an outer peripheral portion of the laminate base can be reduced, these variations in pressure being generated when the compactor passes changes in level formed between a stage and the outer peripheral portion of the laminate base placed on the stage.

According to a fifth aspect of the present invention, in the compactor according to the fourth aspect, the second roller retaining portion may be provided separately from the first roller retaining portion.

This configuration, in which the first and second roller retaining portions are provided separately from each other, makes it possible to distinctively change the pressing force to press the pair of first rollers in relation to the pressing force to press the second roller.

Accordingly, the variations in pressure applied to press the prepreg sheet can be reduced, these variations in pressure being generated when the compactor passes the changes in level formed between the stage and the outer peripheral portion of the laminate base placed on the stage.

According to a sixth aspect of the present invention, the compactor according to the fifth aspect may further include a pressing mechanism retaining portion configured to retain the first pressing mechanism and the second pressing mechanism.

This configuration, in which the pressing mechanism retaining portion that retains the first pressing mechanism and the second pressing mechanism is provided, makes it possible to maintain the predetermined space between the pair of first rollers and the second roller.

Accordingly, even when the first and second roller retaining portions are provided separately from each other, the laminated sheet can be pressed while the predetermined space between the pair of first rollers and the second roller is maintained.

According to a seventh aspect of the present invention, the compactor according to any one of the third to sixth aspects may further include a rotary damper fixed on the roller retaining portion, and a rotating shaft connected to a top of the rotary damper and configured to rotatably support the roller retaining portion.

This configuration, in which the rotary damper fixed on the roller retaining portion and the rotating shaft connected to the top of the rotary damper are provided, makes it possible to, in a case in which the first and second rotating shafts are not aligned in a direction orthogonal to a moving direction of the first and second rollers, absorb and dissipate part of a reaction force by rotating the roller retaining portion when the first and second rollers receive the reaction force from a direction intersecting the moving direction.

This makes it possible to minimize the generation of wrinkles due to the reaction force in the laminated sheet pressed by the compactors.

A prepreg sheet automatic lamination device according to an eighth aspect of the present invention is configured to laminate a plurality of semi-cured prepreg sheets. The prepreg sheet automatic lamination device includes: a compactor group including a plurality of the compactors according to any one of the first to seventh aspects that are arranged; a stage on which the laminate base is placed; a laminated sheet supply portion configured to supply the laminated sheet onto the top surface of the laminate base; and a release sheet recovery portion configured to recover the release sheet peeled off from the semi-cured prepreg sheet pressed, by the compactor group, onto the top surface of the laminate base.

According to the eighth aspect of the present invention, a configuration in which a compactor group includes the plurality of compactors according to any one of the first to seventh aspects that are arranged makes it possible to press the laminated sheet located above the laminate base by causing the compactor group to move in one direction while generating almost no abrasion powder.

This makes it possible to minimize the presence of the abrasion powder between the laminated semi-cured prepreg sheets (in other words, a structural body formed of the laminate base and the semi-cured prepreg sheet that is a constituent of the laminated sheet).

According to a ninth aspect of the present invention, in the prepreg sheet automatic lamination device according to the eighth aspect, the plurality of compactors forming the compactor group may be arranged such that the pair of first rollers and the second roller are alternately disposed in a direction intersecting a feed direction of the laminated sheet, and the first roller surfaces that are constituents of one of the compactors may be disposed so as to face the first roller surfaces of the other compactors disposed adjacent to the one of the compactors.

This configuration, in which the plurality of compactors forming the compactor group is arranged such that the pair of first rollers and the second roller are alternately disposed in the direction intersecting the feed direction of the laminated sheet, and the first roller surfaces of one of the compactors are disposed so as to face the first roller surfaces of the other compactors disposed adjacent to the one of the compactors, allows the first roller surfaces that are constituents of the other compactors to press the portions of the laminated sheet that are pressed by the outer peripheral surfaces (in this case, the outer peripheral surfaces located on the opposite side to the gap) of the first rollers, where the pressing force tends to become weaker than the pressing force applied by the surfaces located in the central sections of the first roller surfaces.

This makes it possible to minimize the presence of the air (the air pockets) in the laminated semi-cured prepreg sheets.

Advantageous Effects of Invention

The above-described compactor and prepreg sheet automatic lamination device can minimize the presence of abrasion powder between laminated semi-cured prepreg sheets.

DESCRIPTION OF EMBODIMENTS

Embodiments of the present invention will be described below in detail with reference to the drawings. Note that the drawings used in the following description are for illustrating the configurations of the embodiments of the present invention, and in terms of the size, thickness, dimensions, and the like of each illustrated part, the actual dimensional relationships thereof in a compactor and a prepreg sheet automatic lamination device may be different.

First Embodiment

Figure 1:
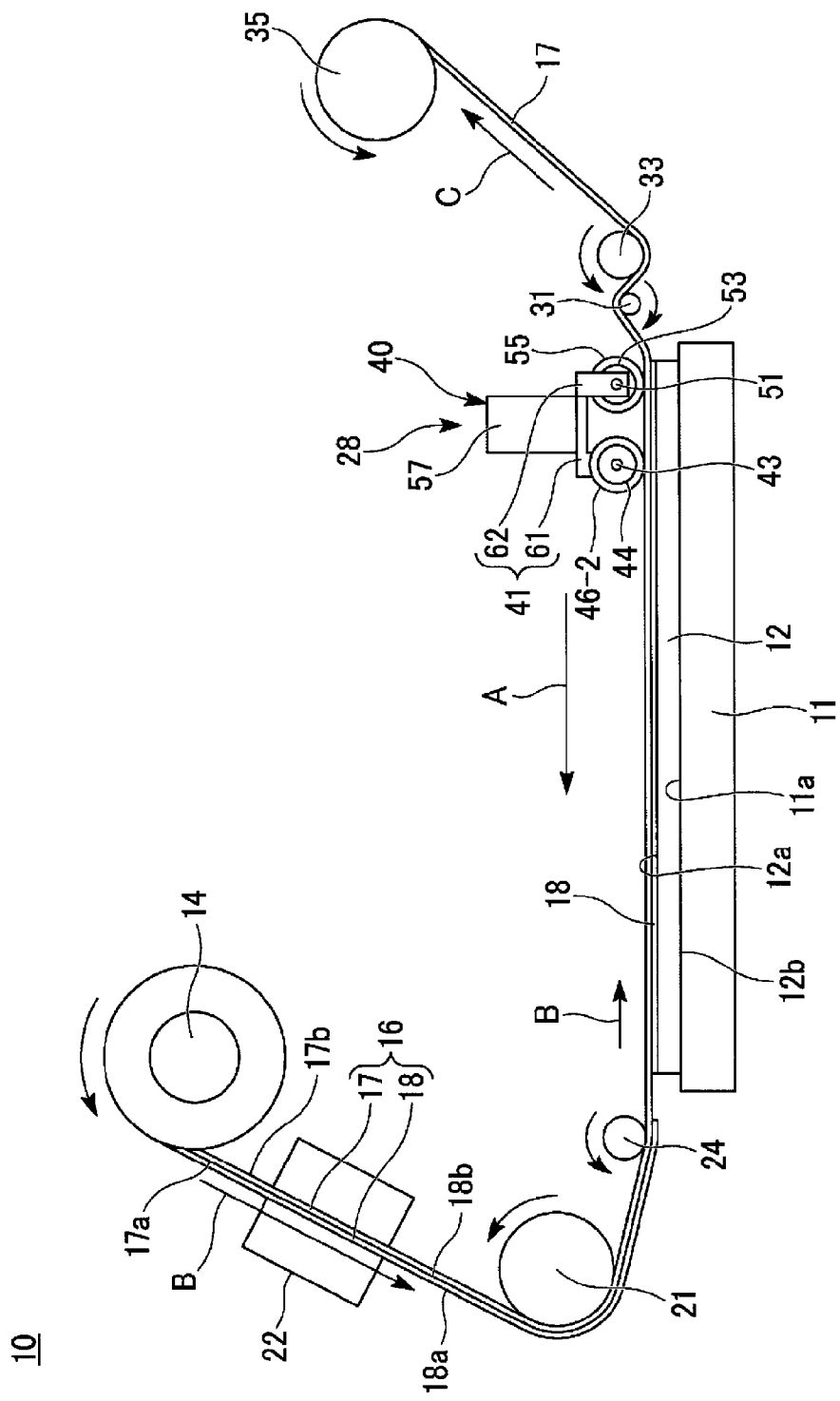
FIG. 1 is a side view schematically illustrating an outline configuration of a prepreg sheet automatic lamination device according to a first embodiment of the present invention.

FIG. 1 is a side view schematically illustrating an outline configuration of a prepreg sheet automatic lamination device according to a first embodiment of the present invention.

FIG. 1 schematically illustrates a state in which a semi-cured prepreg sheet 18 that is a constituent of a laminated sheet 16 is being put on a top surface 12a of a laminate base 12 placed on a stage 11.

In FIG. 1, A indicates a movement direction (hereinafter referred to as a "direction A") of a compactor group 28 formed of a plurality of compactors 40, when the semi-cured prepreg sheet 18 is put on the top surface 12a of the laminate base 12. B indicates a feed direction (hereinafter referred to as a "feed direction B") of the laminated sheet 16 supplied from a laminated sheet winding roller 14, which is a laminated sheet supply portion. C indicates a direction (a direction C) in which a release sheet 17 is recovered.

Further, in FIG. 1, each of the arrows illustrated around each of the various rollers indicates a rotation direction of each of the various rollers.

In FIG. 1, since it is difficult to illustrate the plurality of compactors 40 arranged in one direction to form the compactor group 28, only one of the compactors 40 forming the compactor group 28 is illustrated.

As illustrated in FIG. 1, a prepreg sheet automatic lamination device 10 according to the first embodiment includes the stage 11, the laminated sheet winding roller 14, which is the laminated sheet supply portion, a support roller 21, a cutter 22, guide rollers 24 and 33, the compactor group 28, a scraper roller 31, and a release sheet recovery roller 35, which is a release sheet recovery portion.

The stage 11 is disposed on a platform (not illustrated). The stage 11 has a flat surface that is a laminate base placement surface 11a on which the laminate base 12 is placed.

The laminate base 12 is a laminated body in which one or more semi-cured prepreg sheets are laminated (in other words, a laminated body formed of at least one semi-cured prepreg sheet). The laminate base 12 has the top surface 12a to which the semi-cured prepreg sheet 18 that is a constituent of the laminated sheet 16 is attached.

The laminate base 12 is placed on the stage 11 such that a bottom surface 12b of the laminate base 12 comes into contact with the laminate base placement surface 11a.

The laminated sheet winding roller 14 is disposed upstream from the cutter 22. The laminated sheet 16 is wound onto the laminated sheet winding roller 14.

Here, the configuration of the laminated sheet 16 will be described. The laminated sheet 16 includes the release sheet 17 and the semi-cured prepreg sheet 18. The release sheet 17 has a first surface 17a to which the semi-cured prepreg sheet 18 is attached, and a second surface 17b which is on the opposite side to the first surface 17a and is pressed by a plurality of first roller surfaces 46-1a, 46-2a and a plurality of second roller surfaces 55a (see FIG. 3) that are constituents of the compactor group 28.

A release paper can be used as the release sheet 17, for example.

The prepreg sheet 18 has a first surface 18a, which is put on the top surface 12a of the laminate base 12, and a second surface 18b, which is on the opposite side to the first surface 18a and which is attached to the first surface 17a of the release sheet 17.

The prepreg sheet 18 includes a fiber sheet (not illustrated) and a semi-cured resin with which the fiber sheet is impregnated. For example, glass cloth, carbon fibers, or the like can be used as the fiber sheet.

A heat-curable resin, an ultraviolet-curable resin, or the like in a semi-cured state can be used as the resin forming the prepreg sheet 18, for example. As the heat-curable resin, an acrylic resin, a urea resin, a melamine resin, a phenol resin, an epoxy resin, an unsaturated polyester, an alkyd resin, an urethane resin, ebonite, or the like can be used, for example.

The support roller 21 is disposed between the cutter 22 and the guide roller 24. The roller surface of the support roller 21 is in contact with the second surface 17b of the release sheet 17.

The support roller 21 is configured to change the feed direction of the laminated sheet 16 pulled out from the laminated sheet winding roller 14, support the laminated sheet 17 such that the top surface side of the laminated sheet 16 becomes the second surface 17b of the release sheet 17, and feed the laminated sheet 16 to the guide roller 24.

The cutter 22 is disposed in a location where the cutter 22 can cut the laminated sheet 16 located between the laminated sheet winding roller 14 and the support roller 21. The cutter 22 cuts the laminated sheet 16 inserted thereinto, to a desired length and at a desired angle.

The guide roller 24 is disposed between the support roller 21 and the stage 11. The guide roller 24 has a roller surface that comes into contact with the second surface 17b of the release sheet 17 that is a constituent of the laminated sheet 16.

Coming into contact with the second surface 17b of the release sheet 17 that is a constituent of the laminated sheet 16, the guide roller 24 guides the laminated sheet 16 such that the first surface 18a of the prepreg sheet 18 that is a constituent of the laminated sheet 16 approaches the top surface 12a of the laminate base 12.

Figure 2:
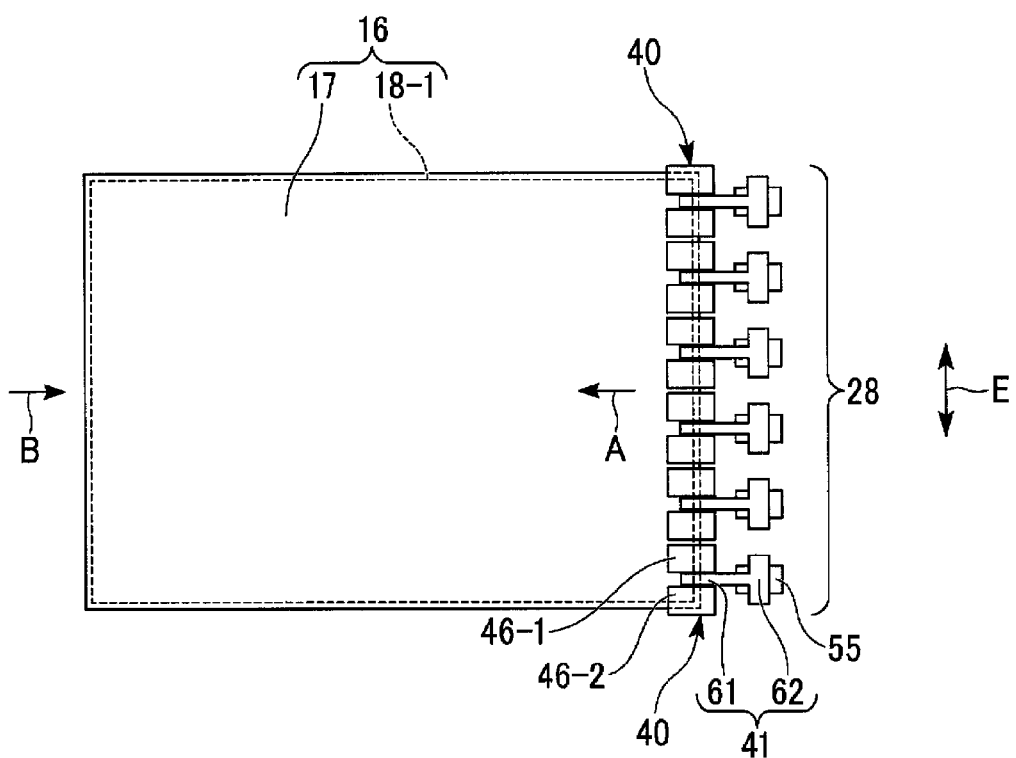
FIG. 2 is a plan view illustrating a shape of a semi-cured prepreg sheet to be put on the top surface of a laminate base and an arrangement of a plurality of compactors forming a compactor group illustrated in FIG. 1.

FIG. 2 is a plan view illustrating a shape of the semi-cured prepreg sheet to be put on the top surface of the laminate base and an arrangement of the plurality of compactors forming the compactor group illustrated in FIG. 1.

In FIG. 2, for ease of explanation, the semi-cured prepreg sheet 18 attached to the top surface 12a of the laminate base 12 illustrated in FIG. 1 is illustrated as a "semi-cured prepreg sheet 18-1." Further, in FIG. 2, to clearly illustrate the positional relationship between a pair of first rollers 46-1 and 46-2, and a second roller 55, an illustration of a pressing mechanism 57 (illustrated in FIG. 1) that is a constituent of the compactor 40 is omitted.

Further, in FIG. 2, as an example, the semi-cured prepreg sheet 18-1 formed in a rectangular shape is illustrated.

E in FIG. 2 indicates a direction (hereinafter referred to as a "direction E") orthogonal to the direction A in which the compactor group 28 moves. In FIG. 2, the same reference signs are used for constituent components that are the same as those illustrated in FIG. 1.

As illustrated in FIG. 2, the compactor group 28 is provided with the plurality of compactors 40. When the shape of the semi-cured prepreg sheet 18-1 is rectangular, the plurality of compactors 40 are arranged in the direction E orthogonal to the direction A in which the compactor group 28 moves.

The plurality of compactors 40 arranged in the direction E are disposed such that the pair of first rollers 46-1 and 46-2 are located on the direction A side.

Thus, when the compactor group 28 is moved in the direction A by a drive device (specifically, a drive device (not illustrated) that moves the compactor group 28 in the direction A), the semi-cured prepreg sheet 18-1 is pressed by the first roller surfaces 46-1a and 46-2a of the pair of first rollers 46-1 and 46-2, and is then pressed by the second roller surface 55a of the second roller 55 (see FIG. 3 described below).

Figure 3:
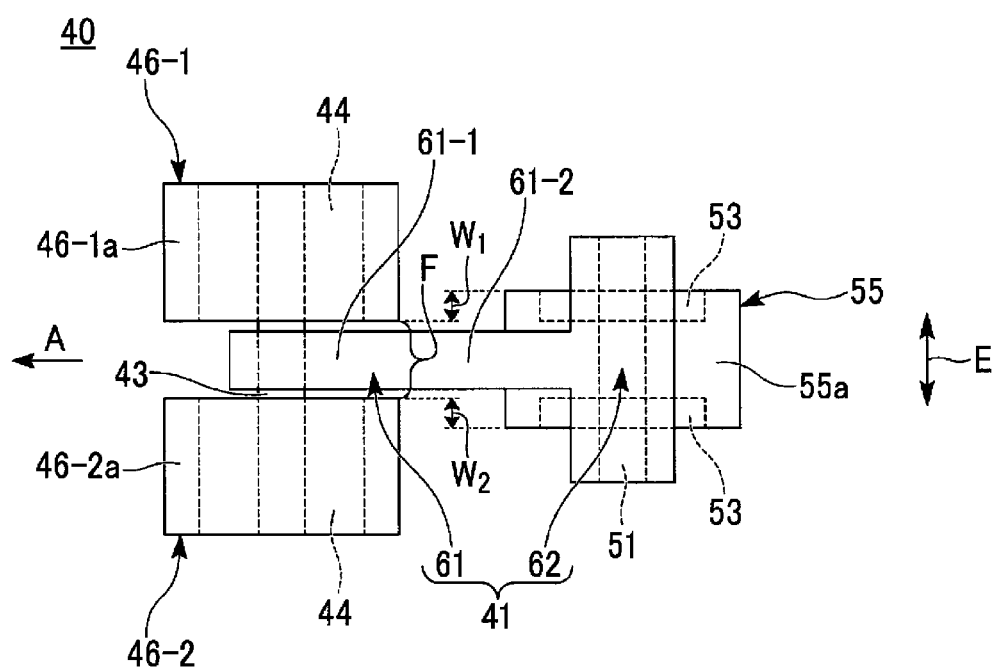
FIG. 3 is an enlarged view of one of the plurality of compactors illustrated in FIG. 2.

FIG. 3 is an enlarged view of one of the plurality of compactors illustrated in FIG. 2. In FIG. 3, the same reference signs are used for constituent components that are the same as those illustrated in FIGS. 1 and 2.

Figure 4:
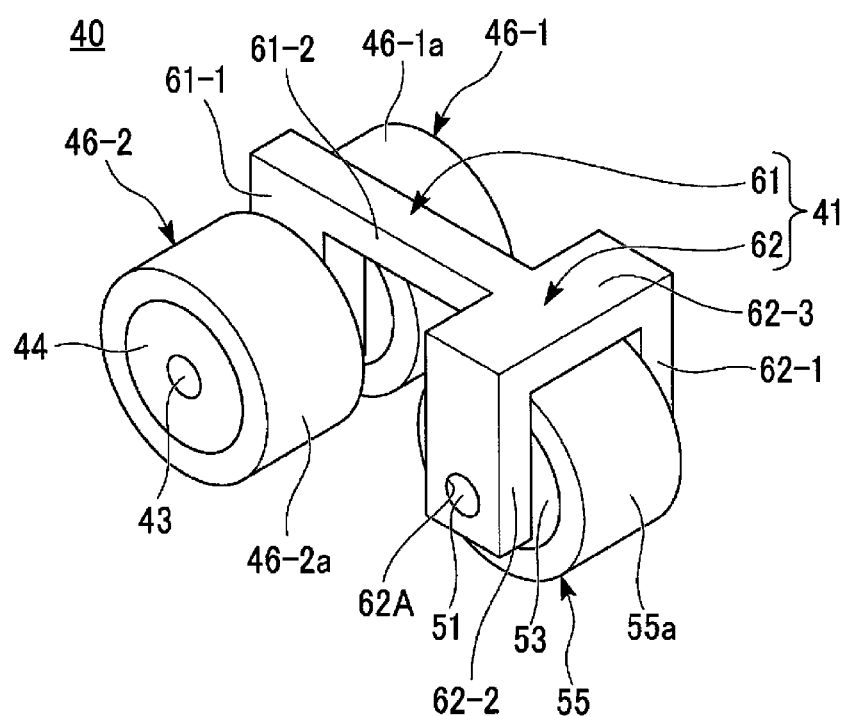
FIG. 4 is a perspective view of the compactor illustrated in FIG. 3.
Figure 5:
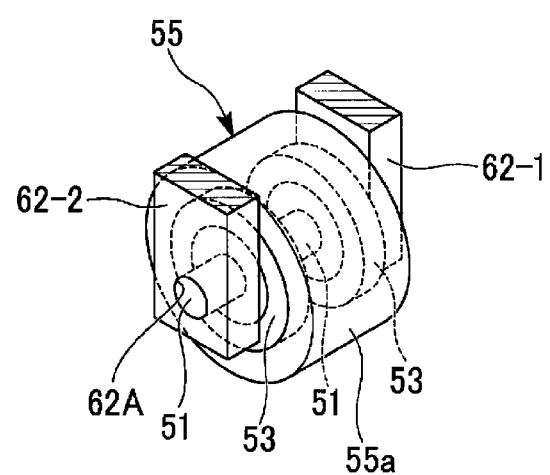
FIG. 5 is a perspective view illustrating first bearing portions disposed between first roller retaining portions that are constituents of the compactor illustrated in FIG. 4.

FIG. 4 is a perspective view of the compactor illustrated in FIG. 3. FIG. 5 is a perspective view illustrating first bearing portions disposed between first roller retaining portions that are constituents of the compactor illustrated in FIG. 4.

In FIGS. 4 and 5, the same reference signs are used for constituent components that are the same as those illustrated in FIGS. 1 to 3.

As illustrated in FIGS. 1 to 5, the compactor 40 includes a roller retaining portion 41, a first rotating shaft 43, first bearing portions 44, the first rollers 46-1, 46-2 corresponding to a pair of first rollers, a second rotating shaft 51, second bearing portions 53, the second roller 55, and the pressing mechanism 57.

The roller retaining portion 41 includes a first roller retaining portion 61 and a second roller retaining portion 62. The first roller retaining portion 61 includes a rotating shaft insertion portion 61-1 and a first connecting portion 61-2.

The rotating shaft insertion portion 61-1 is disposed between the first rollers 46-1 and 46-2 with a gap provided therebetween. The rotating shaft insertion portion 61-1 has a through-hole (not illustrated) through which the first rotating shaft 43 is inserted. The rotating shaft insertion portion 61-1 extends in a direction orthogonal to the laminate base placement surface 11a of the stage 11.

The first connecting portion 61-2 extends from the rotating shaft insertion portion 61-1 toward a second connecting portion 62-3. One end of the first connecting portion 61-2 is connected to the rotating shaft insertion portion 61-1, and the other end of the first connecting portion 61-2 is connected to the second connecting portion 62-3. The first connecting portion 61-2 is integrally formed with the rotating shaft insertion portion 61-1 and the second connecting portion 62-3.

The shape of the first roller retaining portion 61 having the above-described configuration may be an L-shape, for example.

The second roller retaining portion 62 includes rotating shaft support portions 62-1 and 62-2 and the second connecting portion 62-3.

The rotating shaft support portions 62-1 and 62-2 are disposed so as to sandwich the second roller 55 therebetween with gaps provided between the second roller 55 and each of the rotating shaft support portions 62-1 and 62-2. The rotating shaft support portions 62-1 and 62-2 extend in the direction orthogonal to the laminate base placement surface 11a of the stage 11.

Each of the rotating shaft support portions 62-1 and 62-2 has a through-hole 62A through which the second rotating shaft 51 is inserted.

The second connecting portion 62-3 extends in the direction from the top end of the rotating shaft support portion 62-1 toward the top end of the rotating shaft support portion 62-2. The second connecting portion 62-3 is integrally formed with the top ends of the rotating shaft support portions 62-1 and 62-2.

The shape of the second roller retaining portion 62 having the above-described configuration may be a U-shape, for example.

The first rotating shaft 43 is inserted through the through-hole (not illustrated) provided in the rotating shaft insertion portion 61-1, so as to protrude from both sides of the rotating shaft insertion portion 61-1. As a result of the first rotating shaft 43 being inserted through the through-hole, the position of the first rotating shaft 43 is regulated.

The first bearing portions 44 are provided on sections of the first rotating shaft 43 corresponding to the locations at which the first rollers 46-1 and 46-2 are arranged. The two first bearing portions 44 provided on the first rotating shaft 43 are each rotatable with respect to the first rotating shaft 43.

The first roller 46-1 has a bearing housing portion (not illustrated) that is disposed in the central section of the first roller 46-1 and capable of housing the first bearing portion 44, and the first roller surface 46-1a that presses the laminated sheet 16.

The first roller 46-1 is fixed to the outer side of one of the first bearing portions 44. Accordingly, the first roller 46-1 is rotatable with respect to the first rotating shaft 43.

The first roller 46-2 has a bearing housing portion (not illustrated) that is disposed in the central section of the first roller 46-2 and which can house the first bearing portion 44, and the first roller surface 46-2a that presses the laminated sheet 16 from the second surface 17b side of the release sheet 17.

The first roller 46-2 is fixed to the outer side of the other first bearing portion 44. Accordingly, the first roller 46-2 is rotatable with respect to the first rotating shaft 43. The first roller 46-2 is disposed so as to face the first roller 46-1.

The diameter of the second roller 46-2 is the same as that of the first roller 46-1. The diameter of the first and second rollers 46-1 and 46-2 may be set as appropriate within a range from 20 to 60 mm, for example.

In this case, the width of the first and second rollers 46-1 and 46-2 in the direction E may be set as appropriate within a range from 14 to 25 mm, for example.

The second rotating shaft 51 is disposed so as to pass through the through-holes 62A provided in the rotating shaft support portions 62-1 and 62-2. Accordingly, one end of the second rotating shaft 51 is fixed to the rotating shaft support portion 62-1, and the other end of the second rotating shaft 51 is fixed to the rotating shaft support portion 62-2.

The two second bearing portions 53 are provided on a section of the second rotating shaft 51 located between the rotating shaft support portions 62-1 and 62-2 with gaps respectively provided between the second bearing portions 53 and the rotating shaft support portions 62-1 and 62-2. The two second bearing portions 53 are disposed in positions allowing the second bearing portions 53 to be housed inside the second roller 55. The second bearing portions 53 are rotatable with respect to the second rotating shaft 51.

As well as housing the two second bearing portions 53, the second roller 55 has a through-hole (not illustrated), through which the second rotating shaft 51 passes with a gap provided between the second roller 55 and the second rotating shaft 51, and the second roller surface 55a, which presses the laminated sheet 16 from the second surface 17b side of the release sheet 17.

This configuration, in which the first rollers 46-1 and 46-2 having the first roller surfaces 46-1a and 46-2a that press the laminated sheet 16, and the second roller 55 having the second roller surface 55a that presses the laminated sheet 16 are provided, allows the first roller surfaces 46-1a and 46-2a, and the second roller surface 55a to press the laminated sheet 16 while rotating.

Accordingly, the first rollers 46-1 and 46-2, and the second roller 55 generate almost no abrasion powder when pressing the laminated sheet 16, minimizing the presence of abrasion powder between the laminated semi-cured prepreg sheets (in other words, a structural body formed of the laminate base 12 and the semi-cured prepreg sheet 18 that is a constituent of the laminated sheet 16).

The second roller 55 is disposed such that the second roller surface 55a faces a gap F provided between the first rollers 46-1 and 46-2 (specifically, a gap provided for disposing the rotating shaft insertion portion 61 between the first rollers 46-1 and 46-2 without the rotating shaft insertion portion 61 coming into contact with the first rollers 46-1 and 46-2).

This configuration, in which the second roller 55 is disposed such that the second roller surface 55a faces the gap F provided between the first rollers 46-1 and 46-2, allows the second roller surface 55a to press portions of the laminated sheet 16 that cannot be pressed by the first roller surfaces 46-1a and 46-2a (in other words, portions of the laminated sheet 16 with which the first roller surfaces 46-1a and 46-2a do not come into contact).

Further, the second roller 55 is disposed such that the second roller surface 55a faces outer peripheral surfaces located on the gap F side of the first roller surfaces 46-1a and 46-2a.

This configuration, in which the second roller surface 55a faces the outer peripheral surfaces located on the gap F side of the first roller surfaces 46-1a and 46-2a, the gap F being provided between the first rollers 46-1 and 46-2, allows the second roller surface 55a to press portions of the laminated sheet 16 pressed by the outer peripheral surfaces (in this case, the outer peripheral surfaces located on the gap F side) of the first rollers 46-1 and 46-2, where the pressing force tends to become weaker than the pressing force applied by the surfaces located in the central sections of the first roller surfaces 46-1a and 46-2a.

This makes it possible to minimize the presence of air (air pockets) in portions of the laminated semi-cured prepreg sheets on which the outer peripheral surfaces of the first rollers 46-1 and 46-2 have passed.

The diameter of the second roller 55 having the above-described configuration can be set to the same diameter as that of the first rollers 46-1 and 46-2, for example. Further, the width of the second roller 55 in the direction E may be set as appropriate within a range from 14 to 25 mm, for example.

When the width of the first rollers 46-1 and 46-2 in the direction E is 14 mm, a width $W_1$ in the direction E, over which the second roller surface 55a and the first roller surface 46-1a face each other, and a width $W_2$ in the direction E, over which the second roller surface 55a and the first roller surface 46-2a face each other, can each be set to 3.5 mm, for example.

The pressing mechanism 57 is disposed on the top of the roller retaining portion 41. By pressing the roller retaining unit 41, the pressing mechanism 57 presses the first rollers 46-1 and 46-2, and the second roller 55 with a predetermined pressure, via the roller retaining unit 41. For example, an air cylinder can be used as the pressing mechanism 57.

The scraper roller 31 is disposed between the stage 11 and the guide roller 33. The scraper roller 31 is configured to peel off the release sheet 17 from the semi-cured prepreg sheet 18 that is a constituent of the laminated sheet 16.

The scraper roller 31 rotates while being in contact with the first surface 17a of the release sheet 17 to feed the release sheet 17 to the guide roller 33.

The guide roller 33 is disposed between the scraper roller 31 and the release sheet recovery roller 35. The guide roller 33 rotates while being in contact with the second surface 17b of the release sheet 17 that has been peeled off by the scraper roller 31 to feed the release sheet 17 in the direction toward the release sheet recovery roller 35.

The release sheet recovery roller 35 is disposed downstream from the guide roller 33. The release sheet recovery roller 35 is configured to recover the release sheet 17 by winding the release sheet 17 that has passed the guide roller 33.

The compactor according to the first embodiment includes the first rollers 46-1 and 46-2 having the first roller surfaces 46-1a and 46-2a, which press the laminated sheet 16 from the second surface 17b side of the release sheet 17, and the second roller 55 having the second roller surface 55a, which presses the laminated sheet 16 from the second surface 17b side of the release sheet 17, and which is disposed such that the second roller surface 55a faces the gap F provided between the first rollers 46-1 and 46-2. Accordingly, the first and second roller surfaces 46-1a and 46-2a, and the second roller surface 55a press the laminated sheet 16 while rotating. As a result, when pressing the laminated sheet 16, the first rollers 46-1 and 46-2, and the second roller 55 generate almost no abrasion powder.

This makes it possible to minimize the presence of the abrasion powder between the laminated semi-cured prepreg sheets (in other words, a structural body formed of the laminate base 12 and the semi-cured prepreg sheet 18 that is a constituent of the laminated sheet 16).

In addition, by disposing the second roller 55 such that the second roller surface 55a faces the gap F provided between the first rollers 46-1 and 46-2, which are disposed separated from each other, the second roller surface 55a can press portions of the laminated sheet 16 that have not been pressed by the first roller surfaces 46-1a and 46-2a, thereby further minimizing the presence of the abrasion powder between the laminated semi-cured prepreg sheets.

Further, the prepreg sheet automatic lamination device according to the first embodiment includes the compactor group 28 constituted by the plurality of compactors 40 that have the above-described configuration and are arranged in the direction orthogonal to the direction A, the stage 11 on which the laminate base 12 is placed, the laminated sheet winding roller 14 (the laminated sheet supply portion) that supplies the laminated sheet 16 onto the top surface 12a of the laminate base 12, and the release sheet recovery roller 35 (the release sheet recovery portion) that recovers the release sheet 17 peeled off from the semi-cured prepreg sheet 18, which has been pressed onto the top surface 12a of the laminate base 12 by the compactor group 28. This configuration allows the laminated sheet 16 located on the laminate base 12 to be pressed by the compactor group 28 moving in the one direction (the direction A) generating almost no abrasion powder.

This makes it possible to minimize the presence of the abrasion powder between the laminated semi-cured prepreg sheets (in other words, a structural body formed of the laminate base 12 and the semi-cured prepreg sheet 18 that is a constituent of the laminated sheet 16).

Figure 6:
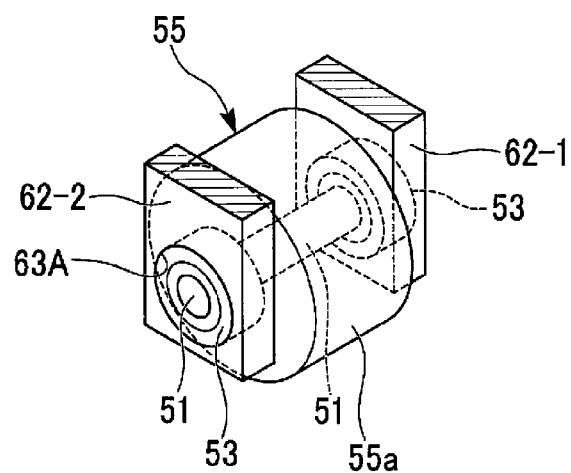
FIG. 6 is a perspective view of main components of the compactor, illustrating other arrangement locations of second bearing portions.

FIG. 6 is a perspective view of main components of the compactor illustrating another arrangement locations of the second bearing portions. In FIG. 6, the same reference signs are used for constituent components that are the same as those illustrated in FIG. 5.

FIG. 5 illustrates a configuration in which the two second bearing portions 53 are disposed inside the second roller 55. However, as illustrated in FIG. 6, instead of the through-holes 62A illustrated in FIG. 5, through-holes 63A, in which the second bearing portions 53 can be disposed, may be provided in the rotating shaft support portions 62-1 and 62-2, and the second bearing portions 53 may be arranged in the through-holes 63A.

The compactor group 28 may be constituted by a plurality of such compactors.

Figure 7:
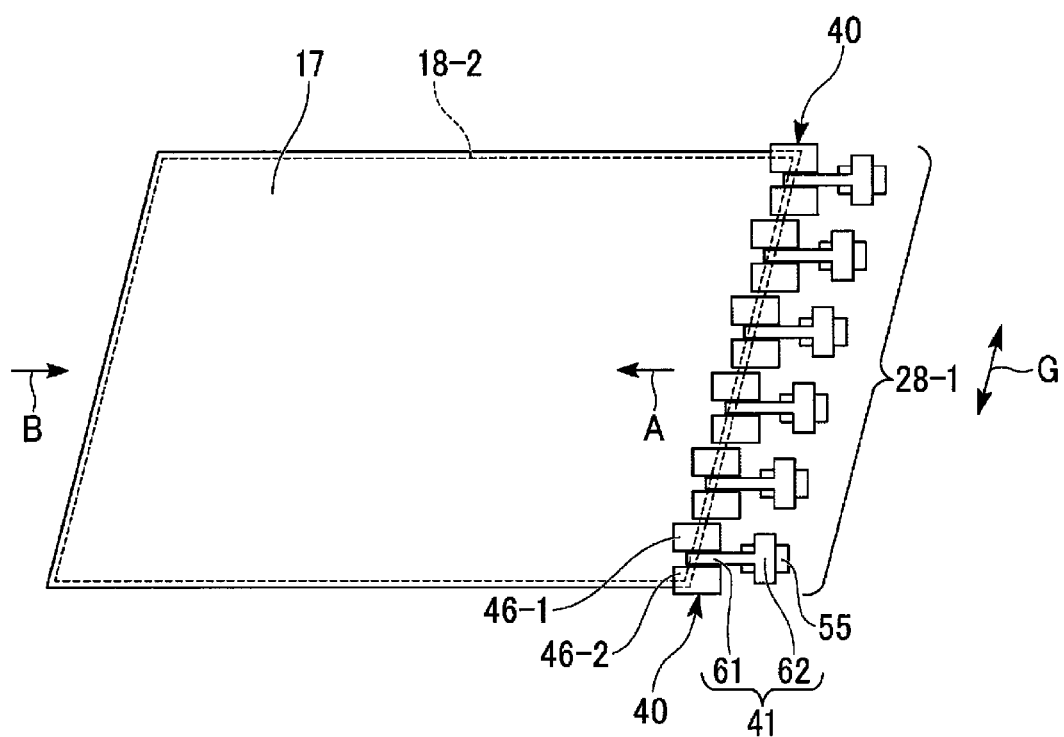
FIG. 7 is a plan view illustrating an arrangement of the plurality of compactors forming a compactor group which is used when the shape of the semi-cured prepreg sheet to be put on the top surface of the laminate base is a parallelogram.

FIG. 7 is a plan view illustrating an arrangement of a plurality of compactors forming a compactor group, which is used when the shape of the semi-cured prepreg sheet to be put on the top surface of the laminate base is a parallelogram.

In FIG. 7, for ease of explanation, the semi-cured prepreg sheet attached to the top surface 12a of the laminate base 12 illustrated in FIG. 1 is illustrated as a "semi-cured prepreg sheet 18-2." Further, in FIG. 7, to clearly illustrate the positional relationship between the first rollers 46-1 and 46-2, and the second roller 55, an illustration of the pressing mechanism 57 (illustrated in FIG. 1) that is a constituent of the compactor 40 is omitted.

G in FIG. 7 indicates an arrangement direction (hereinafter referred to as a "direction G") of the plurality of compactors 40 forming the compactor group 28. The direction G is a direction parallel to one edge of the semi-cured prepreg sheet 18-2. In FIG. 7, the same reference signs are used for constituent components that are the same as those illustrated in FIG. 2.

As illustrated in FIG. 7, when the shape of the semi-cured prepreg sheet 18-2 to be put on the top surface 12a (see FIG. 1) of the laminate base 12 is a parallelogram, a compactor group 28-1 is preferably used in which the plurality of compactors 40 are arranged in the direction G parallel to the one edge of the semi-cured prepreg sheet 18-2.

Even when the shape of the semi-cured prepreg sheet 18-2 to be put on the top surface 12a of the laminate base 12 is a parallelogram, the use of the compactor group 28-1 having the above-described configuration allows the entire prepreg sheet 18-2 to be pressed and minimizes the presence of the abrasion powder between the laminated semi-cured prepreg sheets.

Figure 8:
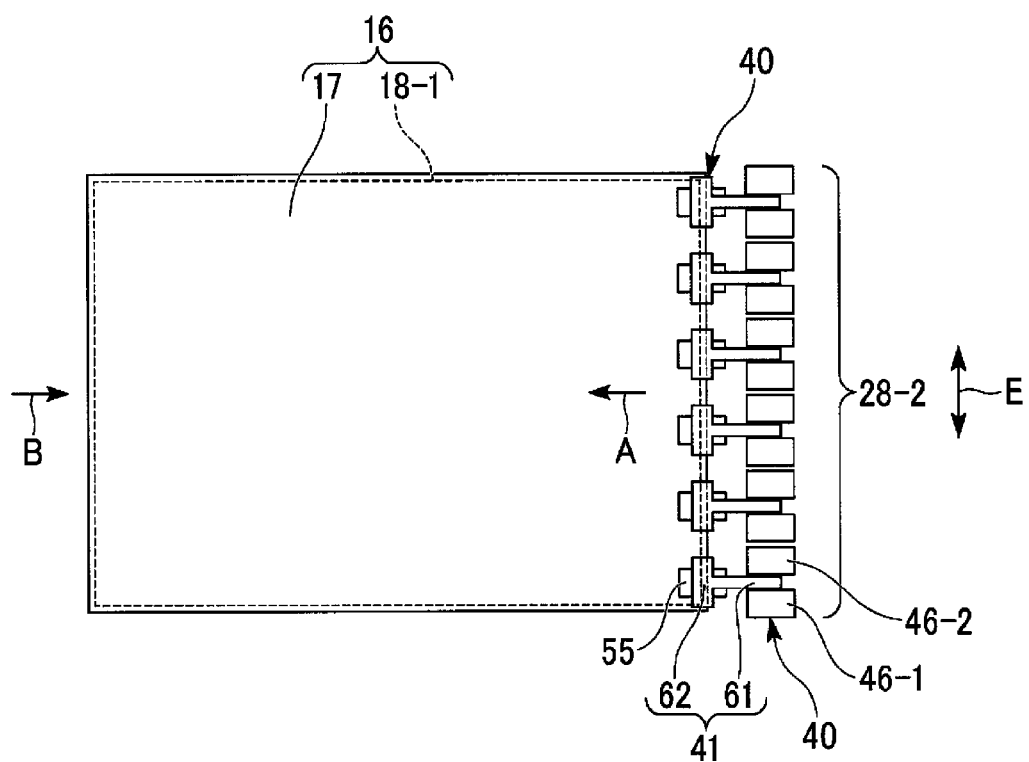
FIG. 8 is a plan view illustrating another compactor group.

FIG. 8 is a plan view illustrating another compactor group. In FIG. 8, to clearly illustrate the positional relationship between the first rollers 46-1 and 46-2, and the second roller 55, an illustration of the pressing mechanism 57 (illustrated in FIG. 1) that is a constituent of the compactor 40 is omitted. Further, in FIG. 8, the same reference signs are used for constituent components that are the same as those illustrated in FIG. 2.

FIG. 2 illustrates a configuration in which the compactor group 28 is constituted by the plurality of compactors 40 that are disposed such that the pairs of first rollers 46-1 and 46-2 is located on the direction A side. However, as illustrated in FIG. 8, a compactor group 28-2 may be constituted by the plurality of compactors 40 that are disposed such that each of the second rollers 55 is located on the direction A side.

A prepreg sheet automatic lamination device including the compactor group 28-2 having the above-described configuration can achieve the same effects as the prepreg sheet automatic lamination device 10 according to the first embodiment including the compactor group 28.

Figure 9:
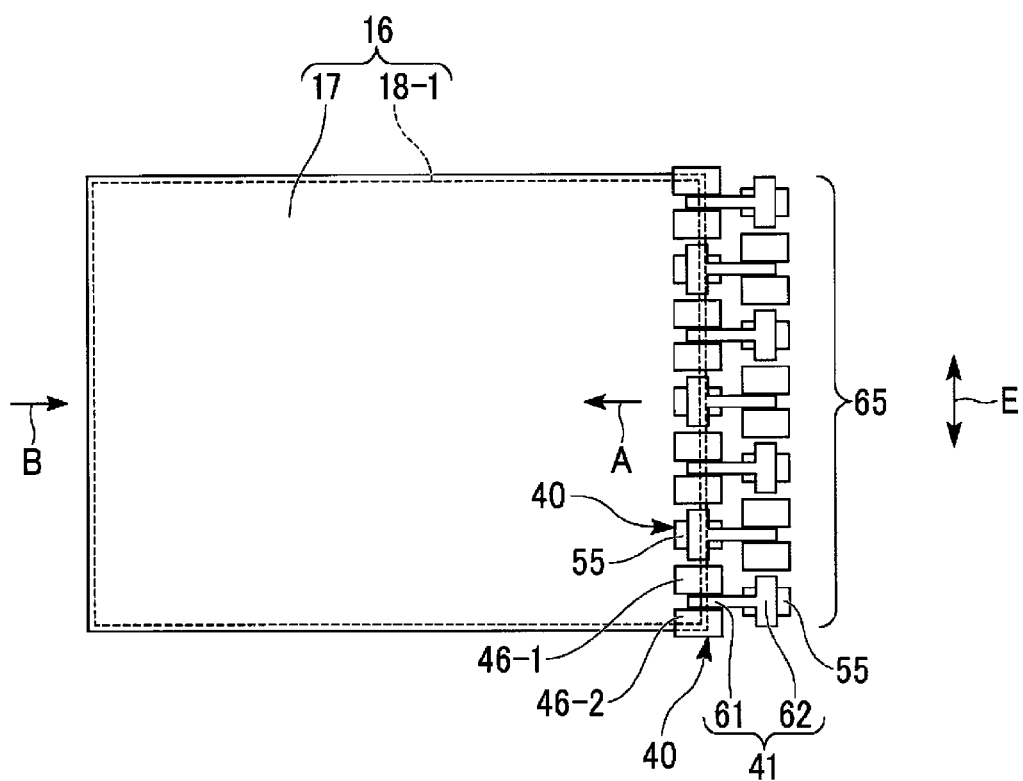
FIG. 9 is a side view schematically illustrating an outline configuration of a prepreg sheet automatic lamination device according to a modified example of the first embodiment of the present invention.

FIG. 9 is a plan view illustrating a compactor group according to a modified example of the first embodiment of the present invention. In FIG. 9, to clearly illustrate the positional relationship between the first rollers 46-1 and 46-2, and the second roller 55, an illustration of the pressing mechanism 57 (illustrated in FIG. 1) that is a constituent of the compactor 40 is omitted. Further, in FIG. 9, the same reference signs are used for constituent components that are the same as those illustrated in FIG. 2.

Figure 10:
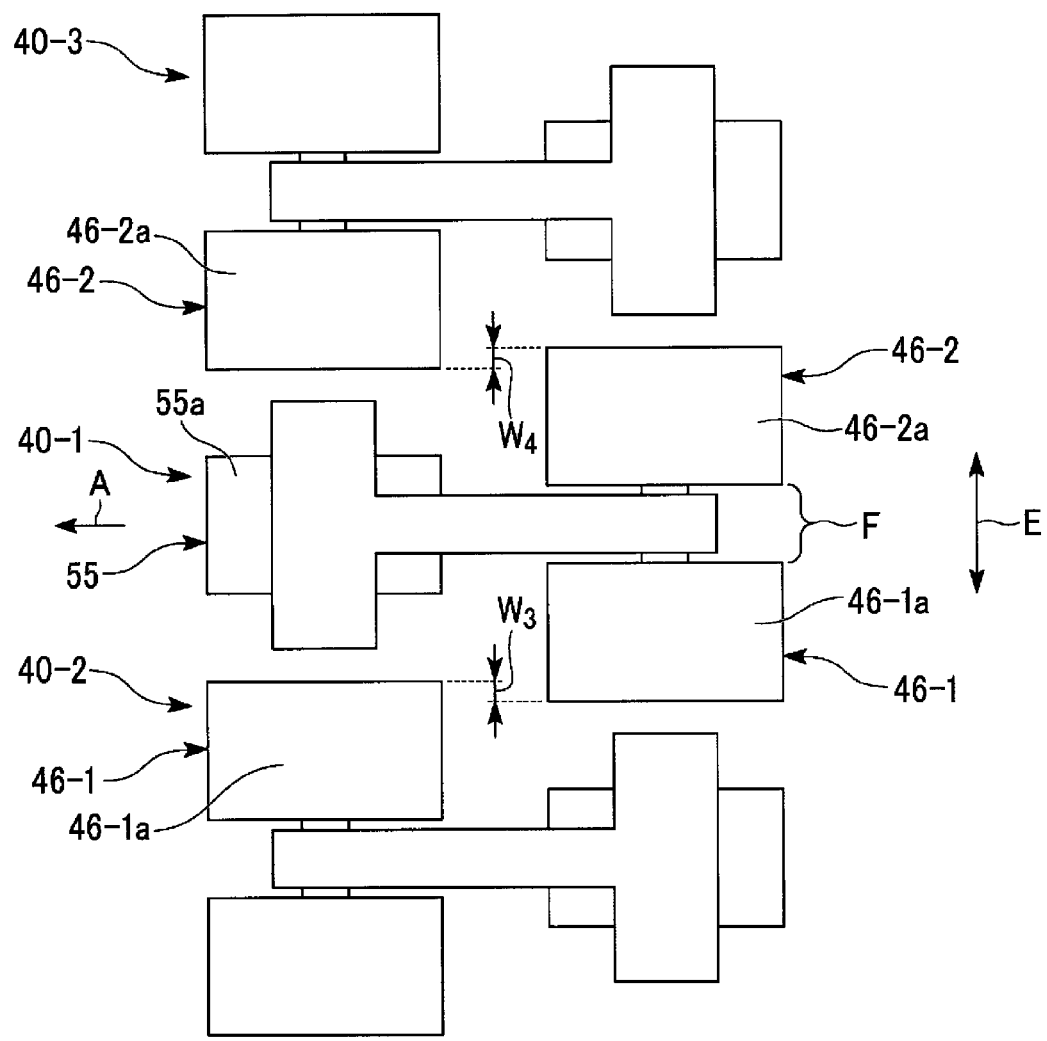
FIG. 10 is an enlarged plan view of part (three of the compactors) of the compactor group according to the modified example of the first embodiment illustrated in FIG. 9.

FIG. 10 is an enlarged plan view of part (three of the compactors) of the compactor group according to the modified example of the first embodiment illustrated in FIG. 9. In FIG. 10, for the ease of explanation, the three compactors (the compactors 40 illustrated in FIG. 9) in FIG. 10 are illustrated as compactors 40-1, 40-2, and 40-3. In FIG. 10, the same reference signs are used for constituent components that are the same as those illustrated in FIG. 9.

As illustrated in FIG. 9 and FIG. 10, a compactor group 65 according to the modified example of the first embodiment is configured in the same manner as the compactor group 28, except that the arrangement of the plurality of compactors 40 forming the compactor group 65 is different from the arrangement of the plurality of compactors 40 forming the compactor group 28 of the first embodiment illustrated in FIG. 2.

The plurality of compactors 40 forming the compactor group 65 are arranged in the direction E orthogonal to the direction A in which the compactor group 65 moves.

The plurality of compactors 40 are arranged such that the first rollers 46-1 and 46-2, and the second rollers 55 are disposed alternately in the direction E intersecting the feed direction B of the laminated sheet 16.

This configuration, in which the first rollers 46-1 and 46-2, and the second rollers 55 are disposed alternately in the direction E intersecting the feed direction B of the laminated sheet 16, allows the second rollers 55 and the first rollers 46-1 and 46-2 disposed in the direction E to be in closer proximity to each other than the compactors 40 arranged as illustrated in FIGS. 2 and 8.

As illustrated in FIG. 10, an outer peripheral portion on one side of the first roller surface 46-1a that is a constituent of the compactor 40-1 is disposed so as to face an outer peripheral portion of the first roller surface 46-1a that is a constituent of the compactor 40-2 disposed in close proximity to the compactor 40-1.

Further, an outer peripheral portion on the other side of the first roller surface 46-2a that is a constituent of the compactor 40-1 is disposed so as to face an outer peripheral portion of the first roller surface 46-2a that is a constituent of the compactor 40-3 disposed in close proximity to the compactor 40-1.

In this manner, the outer peripheral portion on the one side of the first roller surface 46-1a that is a constituent of the compactor 40-1 and the outer peripheral portion of the first roller surface 46-1a that is a constituent of the compactor 40-2 disposed in close proximity to the compactor 40-1 are disposed so as to face each other. Further, the outer peripheral portion on the other side of the first roller surface 46-2a that is a constituent of the compactor 40-1 and the outer peripheral portion of the first roller surface 46-2a that is a constituent of the compactor 40-3 disposed in close proximity to the compactor 40-1 are disposed so as to face each other. This configuration allows the first roller surfaces 46-1a and 46-2a that are constituents of the compactors 40-2 and 40-3 to press portions of the laminated sheet 16 pressed by the outer peripheral portions of the first roller surfaces 46-1a and 46-2a (in this case, sections of the outer peripheral portions of the first roller surfaces 46-1a and 46-2a of the compactor 40-1 that are located on opposite sides to the gap F) where the pressing force tends to become weaker than the pressing force applied by the surfaces located in the central sections of the first roller surfaces 46-1a and 46-2a.

This makes it possible to minimize the presence of the air (the air pockets) in the laminated semi-cured prepreg sheets.

When the widths, in the direction E, of the first rollers 46-1 and 46-2 that are constituents of the compactors 40-1, 40-2, and 40-3 are 14 mm, a width $W_3$, across which the outer peripheral portion on the one side of the first roller 46-1a that is a constituent of the compactor 40-1 and the outer peripheral portion of the first roller 46-1a that is a constituent of the compactor 40-2 face each other, may be set to 3.5 mm, for example.

In this case, a width $W_4$, across which the outer peripheral portion on the other side of the first roller 46-2a that is a constituent of the compactor 40-1 and the outer peripheral portion of the first roller 46-2a that is a constituent of the compactor 40-3 face each other, may be set to 3.5 mm, for example.

The use of the compactor group 65 having the above-described configuration allows the entire surface of the laminated sheet 16 to be pressed with a more uniform pressure than the use of the compactor group 28 according to the first embodiment, thereby further minimizing the presence of the air (the air pockets) in the laminated semi-cured prepreg sheets.

Second Embodiment

Figure 11:
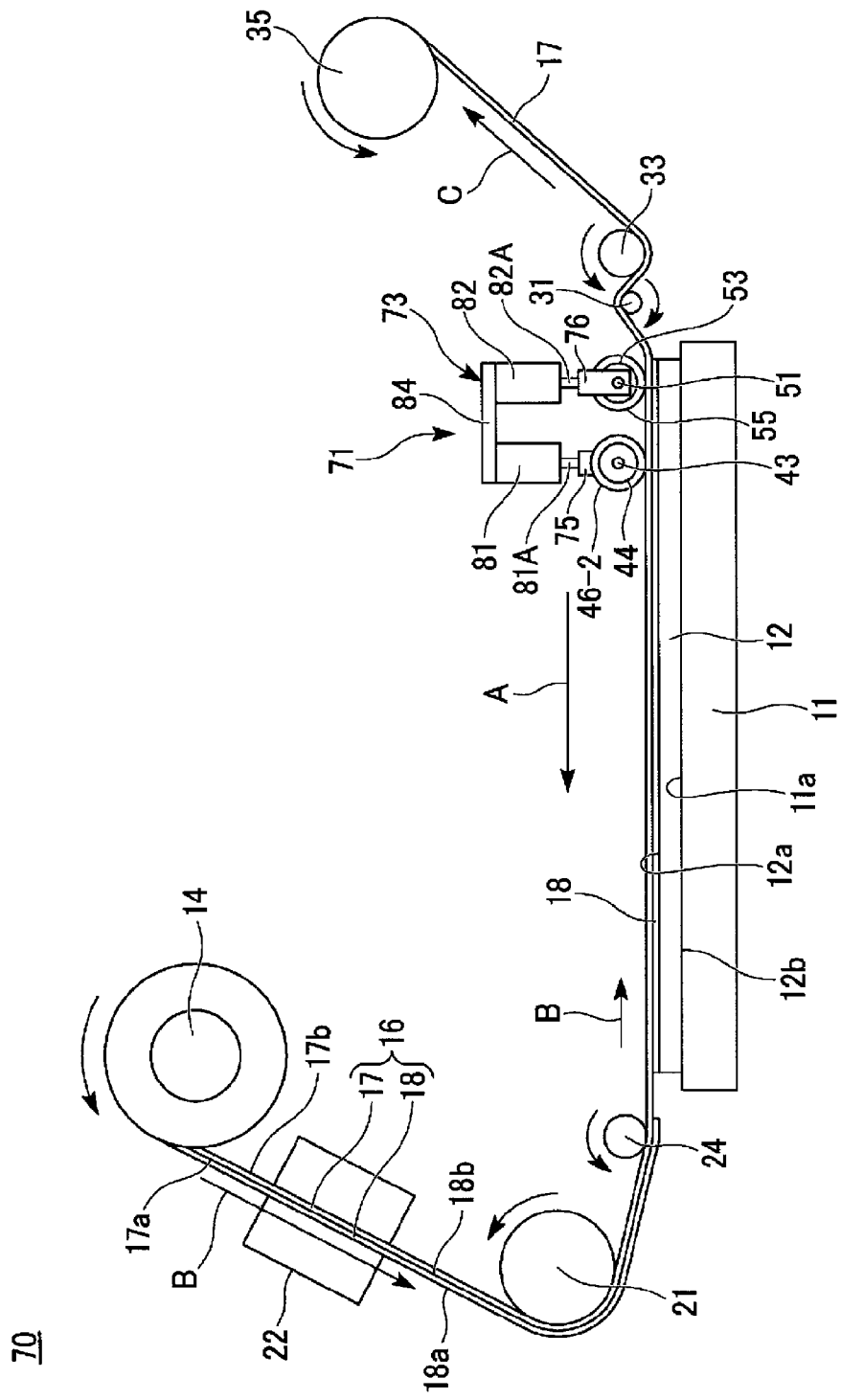
FIG. 11 is a side view schematically illustrating an outline configuration of a prepreg sheet automatic lamination device according to a second embodiment of the present invention.

FIG. 11 is a side view schematically illustrating an outline configuration of a prepreg sheet automatic lamination device according to a second embodiment of the present invention.

In FIG. 11, since it is difficult to illustrate a plurality of compactors 73, forming a compactor group 71, arranged in one direction, only one of the compactors 73 forming the compactor group 71 is illustrated.

Further, in FIG. 11, the same reference signs are used for constituent components that are the same as those of the prepreg sheet automatic lamination device 10 of the first embodiment illustrated in FIG. 1.

As illustrated in FIG. 11, a prepreg sheet automatic lamination device 70 of the second embodiment is configured in the same manner as the prepreg sheet automatic lamination device 10 of the first embodiment, except that the prepreg sheet automatic lamination device 70 includes the compactor group 71 instead of the compactor group 28 that is a constituent of the prepreg sheet automatic lamination device 10.

Figure 12:
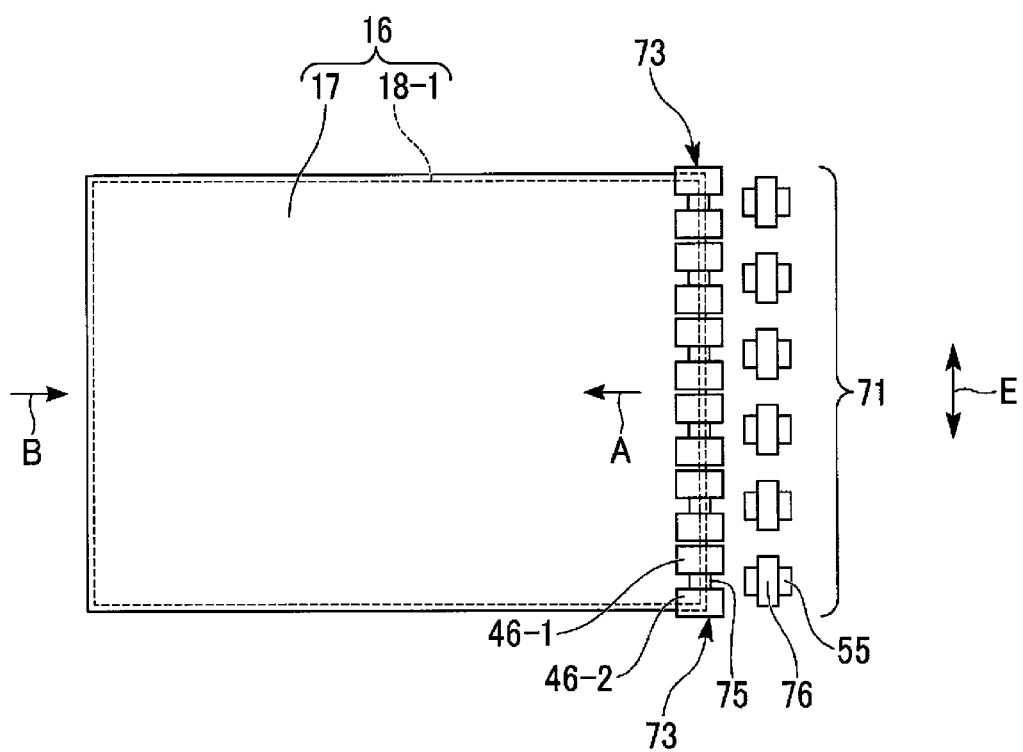
FIG. 12 is a plan view illustrating an arrangement of a plurality of compactors forming a compactor group illustrated in FIG. 11.

FIG. 12 is a plan view illustrating an arrangement of a plurality of compactors forming the compactor group illustrated in FIG. 11.

In FIG. 12, the same reference signs are used for constituent components that are the same as those illustrated in FIG. 2. Further, in FIG. 12, for ease of explanation, to clearly illustrate the positional relationship between the first rollers 46-1 and 46-2, and the second roller 55, illustrations of a first pressing mechanism 81, a second pressing mechanism 82, and a pressing mechanism retaining portion 84 (illustrated in FIG. 11) that is a constituent of the compactor 73 are omitted.

As illustrated in FIG. 12, the compactor group 71 is provided with the plurality of compactors 73. When the shape of the semi-cured prepreg sheet 18-1 is rectangular, the plurality of compactors 73 are arranged in the direction E orthogonal to the direction A in which the compactor group 71 moves.

The plurality of compactors 73 arranged in the direction E are disposed such that the first rollers 46-1 and 46-2 are located on the direction A side.

Thus, when the compactor group 71 is moved in the direction A by a drive device (specifically, a drive device (not illustrated) that moves the compactor group 71 in the direction A), the semi-cured prepreg sheet 18-1 is pressed by the first roller surfaces 46-1a and 46-2a of the first rollers 46-1 and 46-2, and is then pressed by the second roller surface 55a of the second roller 55.

Figure 13:
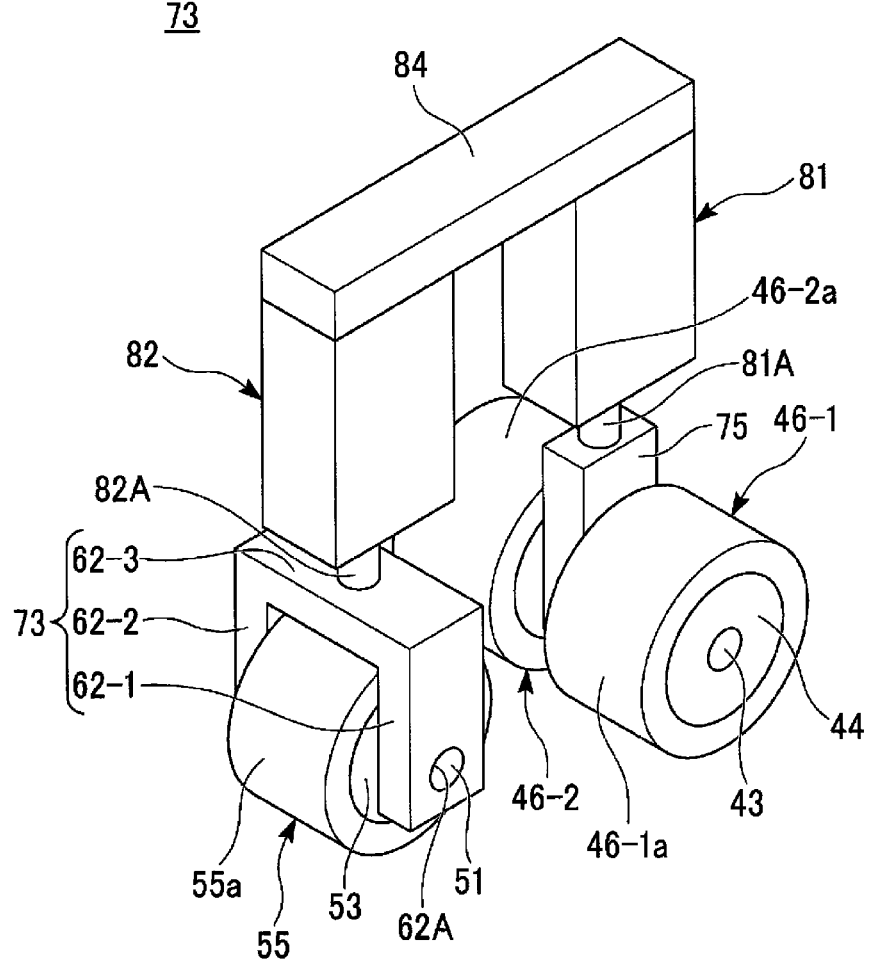
FIG. 13 is a perspective view of the compactor illustrated in FIG. 11.

FIG. 13 is a perspective view of the compactor illustrated in FIG. 11. In FIG. 13, the same reference signs are used for constituent components that are the same as those illustrated in FIGS. 11 and 12.

As illustrated in FIGS. 11 to 13, the compactor 73 is configured in the same manner as the compactor 40, except that the compactor 73 includes first and second roller retaining portions 75 and 76, the first pressing mechanism 81, the second pressing mechanism 82, and the pressing mechanism retaining portion 84 instead of the roller retaining portion 41 and the pressing mechanism 57 that are constituents of the compactor 40 of the first embodiment.

The first roller retaining portion 75 is provided separately from the second roller retaining portion 76 and is disposed separated from the second roller retaining portion 76. The first roller retaining portion 75 is configured in the same manner as the rotating shaft insertion portion 61-1 illustrated in FIG. 4.

More specifically, the first roller retaining portion 75 is configured in the same manner as the first roller retaining portion 61 described in the first embodiment, except that the first roller retaining portion 75 does not have the first connecting portion 61-2 illustrated in FIG. 4.

The second roller retaining portion 76 is configured in the same manner as the second roller retaining portion 62 described in the first embodiment. More specifically, the second roller retaining portion 76 is provided with the rotating shaft support portions 62-1 and 62-2, and the second connecting portion 62-3.

The first pressing mechanism 81 includes a first pressing shaft 81A that presses the first roller retaining portion 75. In the first pressing mechanism 81, the bottom end of the first pressing shaft 81A is connected to the top end of the first roller retaining portion 75. The first pressing mechanism 81 presses the first rollers 46-1 and 46-2 via the first roller retaining portion 75.

The second pressing mechanism 82 includes a second pressing shaft 82A that presses the second roller retaining portion 76. In the second pressing mechanism 82, the bottom end of the second pressing shaft 82A is connected to the top end of the second roller retaining portion 76. The second pressing mechanism 82 presses the second roller 55 via the second roller retaining portion 76.

For example, air cylinders can be used as the first and second pressing mechanisms 81 and 82.

This configuration, in which the first roller retaining portion 75 that rotatably retains the first rollers 46-1 and 46-2 via the first rotating shaft 43, the second roller retaining portion 76 that rotatably retains the second roller 55 via the second rotation shaft 51 and that is provided separately from the first roller retaining portion 75, the first pressing mechanism 81 that presses the first roller retaining portion 75, and the second pressing mechanism 82 that presses the second roller retaining portion 76 are provided, makes it possible to separately control a pressing force to press the first rollers 46-1 and 46-2 via the first roller retaining portion 75 and a pressing force to press the second roller 55 via the second roller retaining portion 76.

Accordingly, variations in the pressure applied to press the prepreg sheet 18, which are generated when the compactor 73 passes changes in level formed between the outer peripheral portion of the laminate base 12 placed on the stage 11 and the laminate base placement surface 11a of the stage 11, can be reduced.

The pressing mechanism retaining portion 84 is disposed on the first and second pressing mechanisms 81 and 82. The pressing mechanism retaining portion 84 is connected to the top ends of the first and second pressing mechanisms 81 and 82 such that the space between the first rollers 46-1 and 46-2, and the second roller 55 become a predetermined space.

This configuration, in which the pressing mechanism retaining portion 84 that retains the first pressing mechanism 81 and the second pressing mechanism 82 is provided, makes it possible to maintain the predetermined space between the first rollers 46-1 and 46-2, and the second roller 55.

Accordingly, even when the first and second roller retaining portions 75 and 76 are provided separately from each other, the laminated sheet 16 can be pressed while the predetermined space between the first rollers 46-1 and 46-2, and the second roller 55 is maintained.

The prepreg sheet automatic lamination device of the second embodiment includes the first and second roller retaining portions 75 and 76 provided separately from each other, the first pressing mechanism 81 that presses the first roller retaining portion 75, and the second pressing mechanism 82 that presses the second roller retaining portion 76. This configuration makes it possible to separately control the pressing force to press the first rollers 46-1 and 46-2 via the first roller retaining portion 75 and the pressing force to press the second roller 55 via the second roller retaining portion 76.

Accordingly, the variations in the pressure applied to press the prepreg sheet 18, which are generated when the compactor 73 passes the laminate base changes in level formed between the outer peripheral portion of the laminate base 12 placed on the stage 11 and the laminate base placement surface 11a of the stage 11, can be reduced.

The first and second pressing mechanisms 81 and 82 illustrated in FIG. 11 may be provided instead of the pressing mechanism 57 that is a constituent of the compactor 40 described in the first embodiment. Then, the first pressing mechanism 81 may be disposed on the first roller retaining portion 61, and the second pressing mechanism 82 may be disposed on the second roller retaining portion 62.

Further, the plurality of compactors 73 forming the compactor group 71 may be arranged such that the positional relationship between the first rollers 46-1 and 46-2, and the second roller 55 become the same as the above-described positional relationship between the first rollers 46-1 and 46-2, and the second roller 55 as illustrated in FIGS. 8 and 9.

Even when this configuration is used, the variations in pressure applied to the prepreg sheet 18, which are generated when the rollers (the first rollers 46-1 and 46-2 or the second roller 55) pass over the prepreg sheet 18, can be reduced.

Third Embodiment

Figure 14:
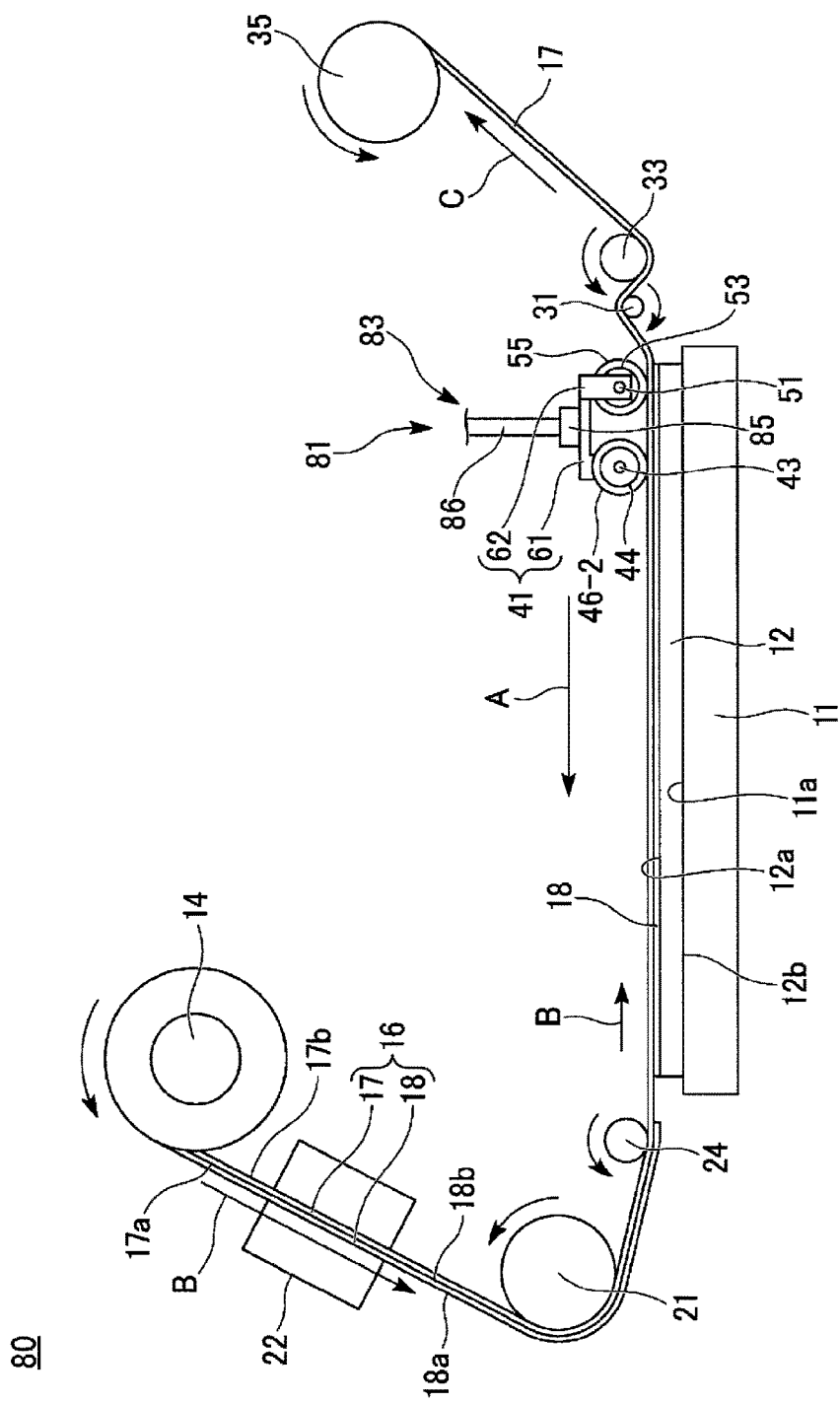
FIG. 14 is a side view schematically illustrating an outline configuration of a prepreg sheet automatic lamination device according to a third embodiment of the present invention.

FIG. 14 is a side view schematically illustrating an outline configuration of a prepreg sheet automatic lamination device according to a third embodiment of the present invention.

In FIG. 14, an illustration of the pressing mechanism 57 illustrated in FIG. 1 is omitted. In FIG. 14, since it is difficult to illustrate a plurality of compactors 83, forming a compactor group 81, arranged in one direction, only one of the compactors 83 forming the compactor group 81 is illustrated.

In FIG. 14, the same reference signs are used for constituent components that are the same as those of the prepreg sheet automatic lamination device 10 of the first embodiment illustrated in FIG. 1.

As illustrated in FIG. 14, a prepreg sheet automatic lamination device 80 of the third embodiment is configured in the same manner as the prepreg sheet automatic lamination device 10 of the first embodiment, except that the prepreg sheet automatic lamination device 80 includes the compactor group 81 instead of the compactor group 28 that is a constituent of the prepreg sheet automatic lamination device 10.

The compactor group 81 includes the plurality of compactors 83. The plurality of compactors 83 are arranged in one direction (specifically, in the direction E illustrated in FIG. 2) such that the positional relationship between the first rollers 46-1 and 46-2, and the second roller 55 become the same as the positional relationship between the first rollers 46-1 and 46-2, and the second roller 55 illustrated in FIG. 2.

The compactor 83 is configured in the same manner as the compactor 40, except that the compactor 83 includes a rotary damper 85 and a rotating shaft 86 in addition to the constituent components of the compactor 40 of the first embodiment.

The rotary damper 85 is fixed on the roller retaining portion 41. The bottom end of the rotating shaft 86 is connected to the top end of the rotary damper 85.

The prepreg sheet automatic lamination device of the third embodiment includes the rotary damper 85 fixed on the roller retaining portion 41 and the rotating shaft 86 connected to the top of the rotary damper 85. In a case in which the first and second rotating shafts 43 and 51 are not aligned in a direction orthogonal to a moving direction (the direction A) of the first and second rollers 46-1, 46-2, and 55, this configuration can absorb and dissipate part of a reaction force by rotating the roller retaining portion 41 when the first rollers 46-1 and 46-2, and the second roller 55 receive the reaction force from a direction intersecting the moving direction.

This makes it possible to minimize the generation of wrinkles due to the reaction force in the laminated sheet 16 pressed by the compactors 83.

Reference Example

Figure 15:
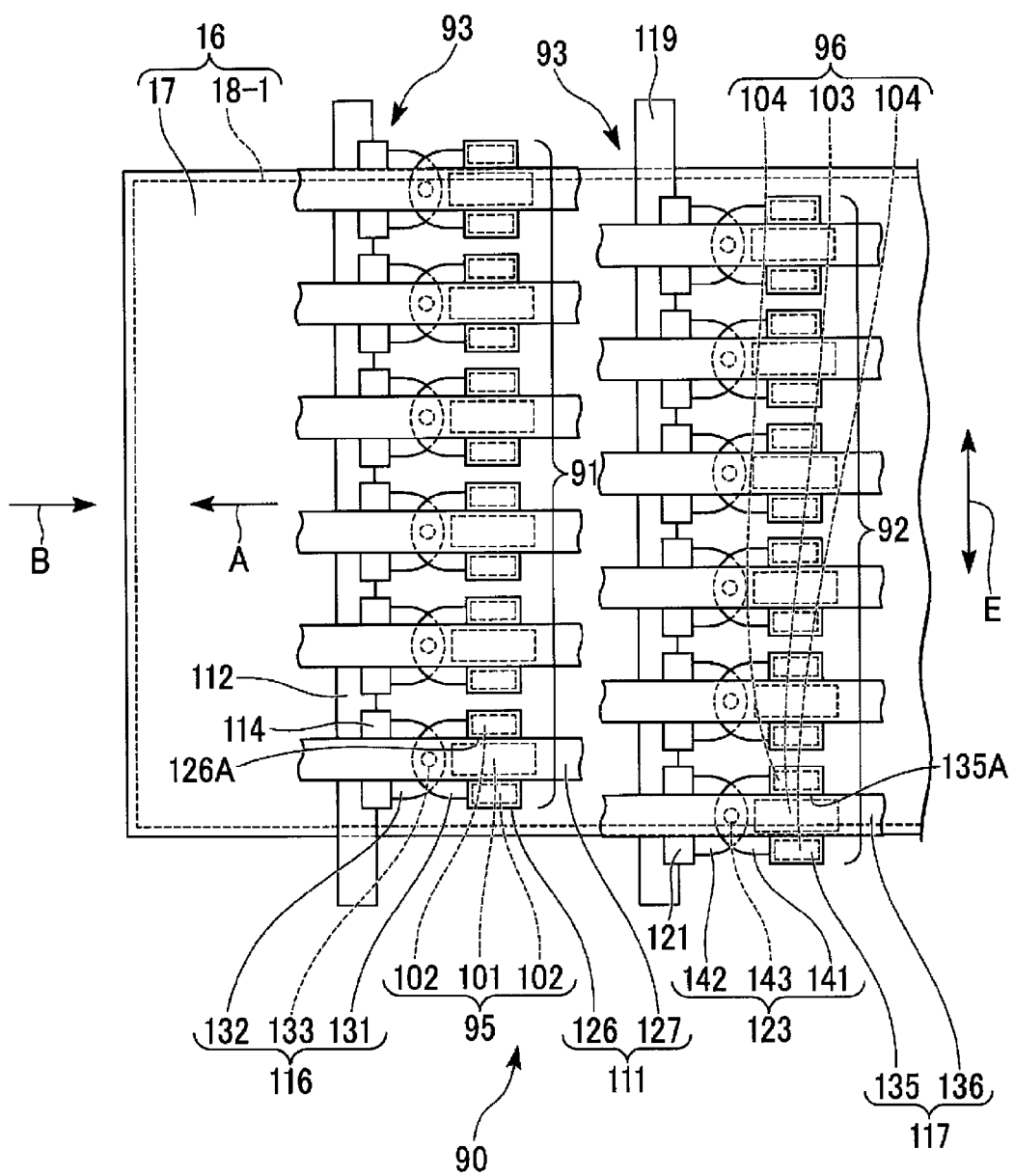
FIG. 15 is a plan view illustrating a compactor group of a reference example.

FIG. 15 is a plan view illustrating a compactor group of a reference example. In FIG. 15, the same reference signs are used for constituent components that are the same as those illustrated in FIG. 2.

As illustrated in FIG. 15, a compactor group 90 of the reference example includes a first compactor group 91, a second compactor group 92, a connecting mechanism 93, a first lifting mechanism (not illustrated) that raises and lowers the first compactor group 91, a second lifting mechanism (not illustrated) that raises and lowers the second compactor group 92, and a drive unit (not illustrated) that moves the connecting mechanism 93 in the direction A.

The compactor group 91 includes a plurality of first compactors 95. The plurality of first compactors 95 are arranged in the direction E.

The first compactor 95 includes a first roller 101 having a first roll surface and a pair of first roller retaining portions 102 disposed on both sides of the first roller 101 so as to rotatably retain the first roller 101.

The compactor group 92 includes a plurality of second compactors 96. The plurality of second compactors 96 are arranged in the direction E.

The second compactor 96 includes a second roller 103 having a second roll surface and a pair of second roller retaining portions 104 disposed on both sides of the second roller 103 so as to rotatably retain the second roller 103.

The plurality of second compactors 96 are each arranged such that the second roller surface of the second roller 96 faces the pair of first roller retaining portions 102 located between the first rollers 101 and a gap provided between the pair of first roller retaining portions 102.

This configuration, in which the second roller surface is disposed so as to face the pair of first roller retaining portions 102 located between the first rollers 101 and the gap provided between the pair of first roller retaining portions 102, allows the entire semi-cured prepreg sheet 18-1 to be pressed, thereby minimizing the presence of the abrasion powder between the laminated semi-cured prepreg sheets (in other words, a structural body formed of the laminate base and the semi-cured prepreg sheet 18-1 that is a constituent of the laminated sheet).

As illustrated in FIG. 15, the connecting mechanism 93 includes first linear guides 111, a first rail 112, blocks 114 and 121, first hinge mechanisms 116, second linear guides 117, a second rail 119, and second hinge mechanisms 123.

Figure 16:
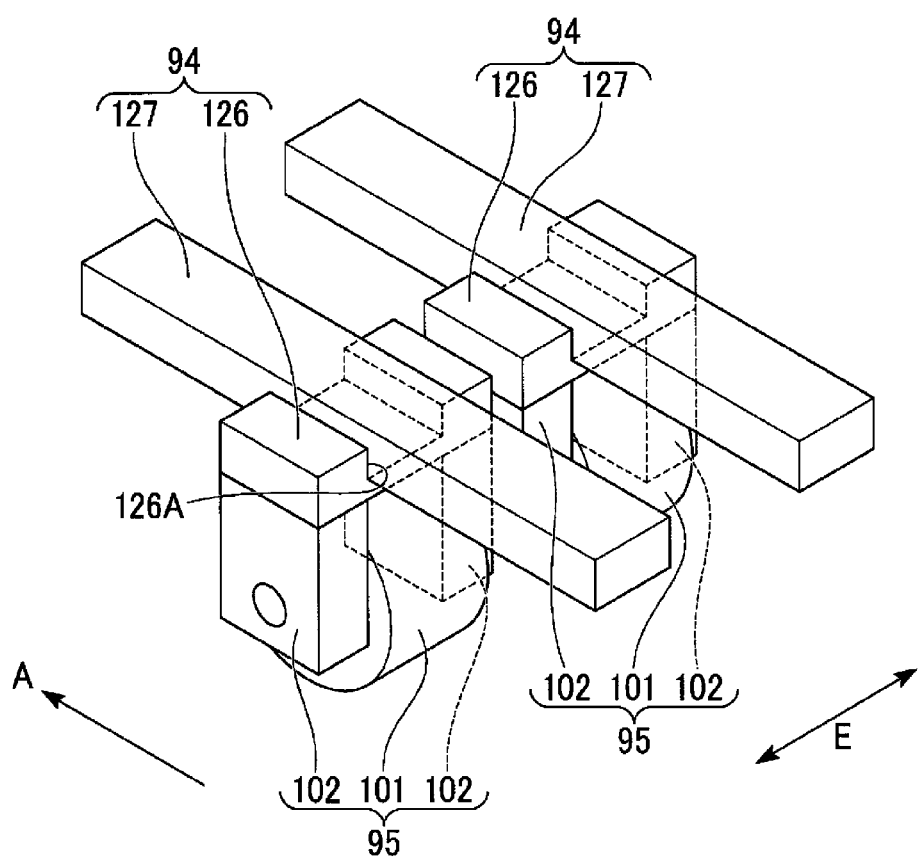
FIG. 16 is a perspective view of part of constituent components forming the compactor group illustrated in FIG. 15.

FIG. 16 is a perspective view of part of constituent components forming the compactor group illustrated in FIG. 15. In FIG. 16, the same reference signs are used for constituent components that are the same as those illustrated in FIG. 15.

As illustrated in FIGS. 15 and 16, each of the first linear guides 111 includes a block 126 and a rail 127. The block 126 is connected to the top ends of the pair of first roller retaining portions 102. The block 126 includes a rail housing portion 126A in the upper portion thereof. The rail housing portion 126A is a groove portion that can house the rail 127 and extends in the direction A in a state illustrated in FIG. 15.

Part of the rail 127 is housed in the rail housing portion 126A. The rail 127 extends in the direction A in the state illustrated in FIG. 15. The rail 127 that is a constituent of the first linear guide 111 can be tilted (in other words, inclined at a predetermined angle) in a direction intersecting the direction A, using a mechanism not illustrated in the drawings.

Note that only part of the rail 127 is illustrated in FIGS. 15 and 16.

As illustrated in FIG. 15, in the state illustrated in FIG. 15, the first rail 112 is arranged so as to face the plurality of first compactors 95. The first rail 112 extends in the direction E. The plurality of first compactors 95 are connected to the first rail 112 via the blocks 114 and 126 and the first hinge mechanisms 116.

Each of the blocks 114 is disposed in a section of the first rail 112 facing the first compactor 95.

The first rail 112 and the blocks 114 form a linear guide.

Each of the first hinge mechanisms 116 includes connecting members 131 and 132 and a hinge portion 133. The connecting member 131 is disposed in the block 126 facing the block 114. The connecting member 132 is provided in the block 114 such that part of the connecting member 132 overlaps with the connecting member 131. The hinge portion 133 is provided in a section in which the connecting members 131 and 132 overlap with each other.

The first hinge mechanism 116 having the above-described configuration is a mechanism for enabling the first compactor 95 to rotate around the hinge portion 133 in the horizontal plane.

The second linear guide 117 includes a block 135 and a rail 136. The block 135 is connected to the top ends of the pair of first roller retaining portions 102. The block 135 includes a rail housing portion 135A in the upper portion thereof. The rail housing portion 135A is a groove portion that can house the rail 136 and extends in the direction A in the state illustrated in FIG. 15.

Part of the rail 136 is housed in the rail housing portion 135A. The rail 136 extends in the direction A in the state illustrated in FIG. 15.

The rail 136 that is a constituent of the second linear guide 117 can be tilted (in other words, inclined at a predetermined angle) in a direction intersecting the direction A, using a mechanism not illustrated in the drawings.

Note that only part of the rail 136 is illustrated in FIG. 15.

The second rail 119 is arranged so as to face the plurality of first and second compactors 95 and 96, in the state illustrated in FIG. 15. The second rail 119 extends in the direction E.

The plurality of second compactors 96 are connected to the second rail 119 via the blocks 121 and 135 and the first hinge mechanisms 123.

Each of the blocks 121 is disposed in a section of the second rail 119 facing the second compactor 96.

The second rail 119 and the blocks 121 form a linear guide.

Each of the second hinge mechanisms 123 includes connecting members 141 and 142 and a hinge portion 143. The connecting member 141 is disposed in the block 135 facing the block 121. The connecting member 142 is provided in the block 121 such that part of the connecting member 142 overlaps with the connecting member 141. The hinge portion 143 is provided in a section in which the connecting members 141 and 142 overlap with each other.

The second hinge mechanism 123 having the above-described configuration is a mechanism for enabling the second compactor 96 to rotate around the hinge portion 143 in the horizontal plane.

In the compactor group 90 having the above-described configuration, when the first and second rails 112 and 119 are inclined, from the state illustrated in FIG. 15, such that the inclination angles of the first and second rails 112 and 119 become the same with respect to the direction E (in other words, when the first and second rails 112 and 119 are rotated by the same angle in the horizontal plane), the first and second compactors 95 and 96 result in being disposed along the direction in which the inclined first and second rails 112 and 119 extend.

At this time, since the direction of the plurality of first compactors 95 is regulated by the rail 127, the first rollers 101 remain facing in the direction A, as illustrated in FIG. 15. Further, since the direction of the plurality of second compactors 96 is regulated by the rail 136, the second rollers 103 remain facing in the direction A, as illustrated in FIG. 15.

Therefore, when pressing the semi-cured prepreg sheet 18-2 whose external shape is a parallelogram, as illustrated in FIG. 7, by causing the first and second rails 112 and 119 to be inclined such that the plurality of first and second compactors 95 and 96 are disposed along an inclined edge of the prepreg sheet 18-2, and by moving the compactor group 90 in the direction A while maintaining the above-described state, the entire prepreg sheet 18-2 can be firmly pressed.

According to the compactor group 90 including the connecting mechanism 93 with the above-described configuration, depending on the shape (the external shape) of the semi-cured prepreg sheet 18-1 or 18-2 to be pressed by the first and second compactor groups 91 and 92, the arrangement direction of the plurality of first and second compactors 95 and 96 can be freely and easily changed within a short period of time.

In FIG. 15, as an example of the connecting mechanism 93, a case has been described in which the first rail 112 is disposed so as not to penetrate through the plurality of first compactors 95, and the second rail 119 is disposed so as not to penetrate through the plurality of second compactors 96. Instead of the above-described configuration, a connecting mechanism may be configured such that the first rail 112 is disposed so as to penetrate through the plurality of first compactors 95, and the second rail 119 is disposed so as to penetrate through the plurality of second compactors 96.

In this case, the connecting mechanism can achieve the same effects as the connecting mechanism 93 illustrated in FIG. 15.

Note that since the configuration of the connecting mechanism becomes complex when the first rail 112 is disposed so as to penetrate through the plurality of first compactors 95, and the second rail 119 is disposed so as to penetrate through the plurality of second compactors 96, in a case in which the first and second roller retaining portions 102 and 104 are provided in the connecting mechanism, the configuration of the connecting mechanism 93 illustrated in FIG. 15 is preferable.

Figure 17A:
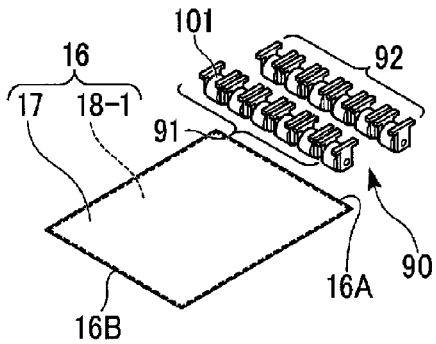
FIG. 17A, a diagram illustrating an operational method of the compactor group illustrated in FIG. 15, is a perspective view schematically illustrating a state in which a first compactor group is moved to a position above a first edge of the laminated sheet.
Figure 17B:
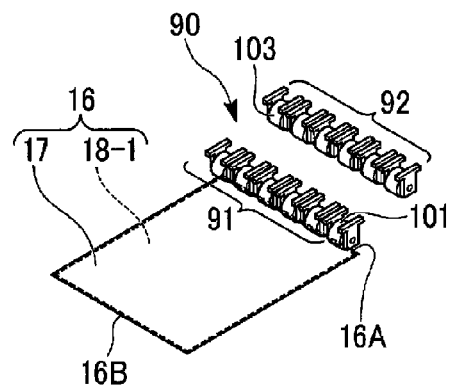
FIG. 17B, a diagram illustrating the operational method of the compactor group illustrated in FIG. 15, is a perspective view schematically illustrating a state in which a plurality of first rollers that are constituents of the first compactor group, are in contact with the first edge of the laminated sheet.
Figure 17C:
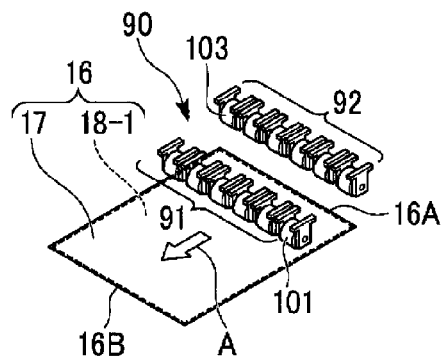
FIG. 17C, a diagram illustrating the operational method of the compactor group illustrated in FIG. 15, is a perspective view schematically illustrating a state in which the first compactor group is moved in a direction A until a second compactor group is moved to the position above the first edge of the laminated sheet.
Figure 17D:
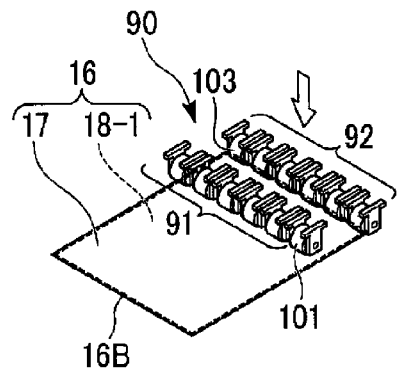
FIG. 17D, a diagram illustrating the operational method of the compactor group illustrated in FIG. 15, is a perspective view schematically illustrating a state in which the first compactor group and the second compactor group are pressing the laminated sheet.
Figure 17E:
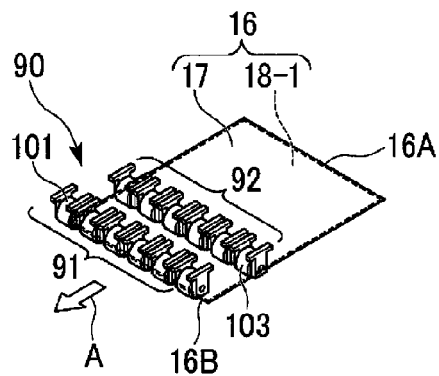
FIG. 17E, a diagram illustrating the operational method of the compactor group illustrated in FIG. 15, is a perspective view schematically illustrating a state in which the first compactor group has moved as far as a position above a second edge of the laminated sheet.
Figure 17F:
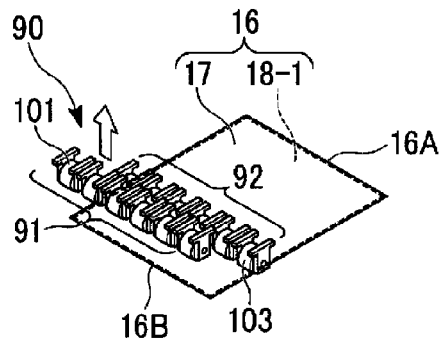
FIG. 17F, a diagram illustrating the operational method of the compactor group illustrated in FIG. 15, is a perspective view schematically illustrating a state in which the first compactor group has been moved upward.
Figure 18:
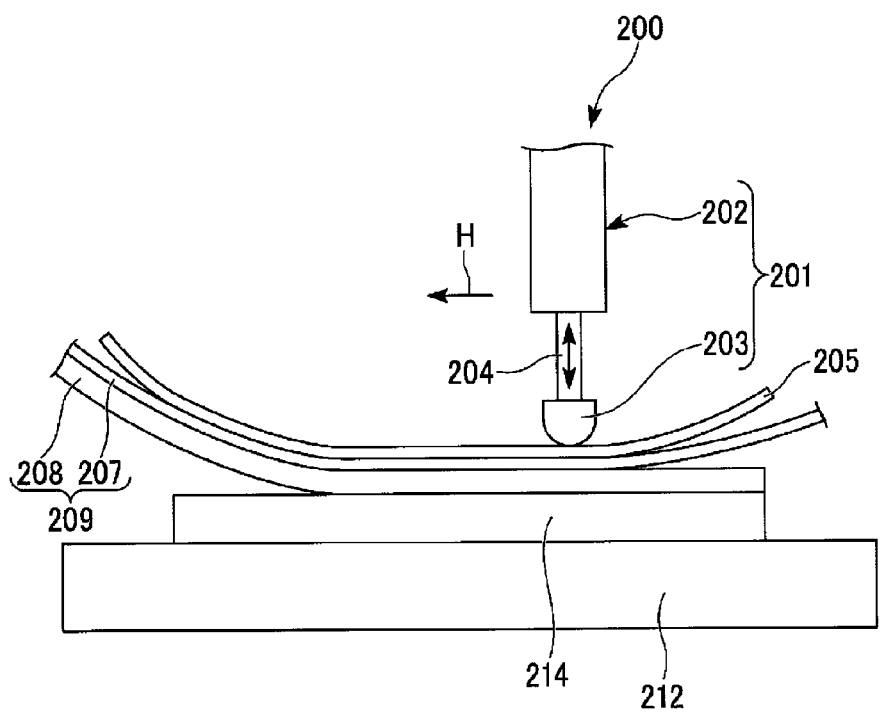
FIG. 18 is a side view schematically illustrating a state in which a compactor group including a plurality of conventional compactors each having a piston mechanism presses a laminated sheet formed of a release sheet and a semi-cured prepreg sheet, via a polytetrafluoroethylene (PTFE) sheet.

FIGS. 17A to 17F are diagrams illustrating an operational method of the compactor group illustrated in FIG. 15. FIG. 17A is a perspective view schematically illustrating a state in which the first compactor group is moved to a position above the first edge of the laminated sheet. FIG. 17B is a perspective view schematically illustrating a state in which the plurality of first rollers that are constituents of the first compactor group are in contact with the first edge of the laminated sheet. FIG. 17C is a perspective view schematically illustrating a state in which the first compactor group is moved in the direction A until the second compactor group is moved to the position above the first edge of the laminated sheet. FIG. 17D is a perspective view schematically illustrating a state in which the first and second compactor groups are pressing the laminated sheet. FIG. 17E is a perspective view schematically illustrating a state in which the first compactor group is moved as far as a position above the second edge of the laminated sheet. FIG. 17F is a perspective view schematically illustrating a state in which the first compactor group is moved upward.

In FIGS. 17A to 17E, the same reference signs are used for constituent components that are the same as those illustrated in FIG. 15. Further, in FIGS. 17A to 17F, for ease of explanation, an illustration of the connecting mechanism 93 (illustrated in FIG. 15) that is a constituent of the compactor group 90 is omitted, and only the first and second compactor groups 91 and 92 are illustrated.

Next, with reference to FIGS. 17A to 17E, the operational method of the compactor group 90 illustrated in FIG. 15 will be described.

First, as illustrated in FIG. 17A, the first compactor group 91 is moved to a position above a first edge 16A of the laminated sheet 16. Accordingly, the first roller surfaces of the plurality of first rollers 101 that are constituents of the first compactor group 91 are disposed so as to face the first edge 16A of the laminated sheet 16.

At this time, the second compactor group 92 disposed behind the first compactor group 91 is moved upward to the same height as the first compactor group 91 by the second lifting mechanism (not illustrated).

Next, as illustrated in FIG. 17B, the first compactor group 91 is moved downward by the first lifting mechanism (not illustrated) such that the first roller surfaces of the plurality of first rollers 101 come into contact with the first edge 16A of the laminated sheet 16.

Next, as illustrated in FIG. 17C, the first compactor group 91 is moved in the direction A until the second compactor group 92 is moved to the position above the first edge 16A of the laminated sheet 16. At this time, although the laminated sheet 16 is pressed by the first roller surfaces of the plurality of first rollers 101, portions of the laminated sheet 16 located between the first rollers 101 are not pressed by the first roller surfaces.

Next, as illustrated in FIG. 17D, after the second compactor group 92 is moved downward by the second lifting mechanism (not illustrated) such that the second roller surfaces of the plurality of second rollers 103 come into contact with the first edge 16A of the laminated sheet 16, the first and second roller surfaces of the plurality of first and second rollers 101 and 103 start pressing the laminated sheet 16.

Accordingly, since the portions of the laminated sheet 16 located between the first rollers 101 (in other words, the portions of the laminated sheet 16 that have not been pressed by the first rollers 101) are pressed by the second roller surfaces of the second rollers 103, the entire surface of the laminated sheet 16 can be pressed.

Next, as illustrated in FIG. 17E, the first compactor group 91 is moved to the position above a second edge 16B of the laminated sheet 16. With this, the pressing of the laminated sheet 16 by the first compactor group 91 is terminated.

Next, as illustrated in FIG. 17F, the first lifting mechanism (not illustrated) moves the first compactor group 91 upward to separate the first roller surfaces of the plurality of first rollers 101 from the laminated sheet 16.

Next, the second compactor group 92 illustrated in FIG. 17F is moved as far as the position above the second edge 16B of the laminated sheet 16. With this, the pressing of the laminated sheet 16 by the plurality of second rollers 103 is terminated.

After this, as a result of causing the second roller surfaces of the plurality of second rollers 103 to be separated from the laminated sheet 16 by moving the second rollers 103 upward using the second lifting mechanism (not illustrated), pressing processing of the laminated sheet 16 using the compactor group 90 including the first and second compactor groups 91 and 92 is terminated.

The operations of the first and second compactor groups 91 and 92 in accordance with the above-described method allows the entire laminated sheet 16 (in other words, the entire semi-cured prepreg sheet 18-1) to be pressed. This makes it possible to minimize the presence of the abrasion powder between the laminated semi-cured prepreg sheets (in other words, a structural body formed of the laminate base 12 and the semi-cured prepreg sheet 18-1 that is a constituent of the laminated sheet 16).

The above-described compactor group 90 can achieve the same effects as the compactor group 71 illustrated in FIG. 11 by moving the first compactor group 91 upward and downward using the first lifting mechanism (not illustrated) and by moving the second compactor group 92 upward and downward using the second lifting mechanism (not illustrated).

Although preferable embodiments of the present invention have been described above in detail, the present invention is not limited to those specific embodiments. Various modifications and changes can be made to the embodiments without departing from the scope and spirit of the present invention described in the claims.

INDUSTRIAL APPLICABILITY

According to the compactor and the prepreg sheet automatic lamination device including the compactor, the laminated sheet, which includes the release sheet and the semi-cured prepreg sheet attached to the first surface of the release sheet, can be pressed onto the top surface of the laminate base, which is formed of at least one layer of the semi-cured prepreg sheets, from the second side of the release sheet of the laminated sheet.

REFERENCE SIGNS LIST 10, 70, 80 Prepreg sheet automatic lamination device
11 Stage
11a Laminate base placement surface
12 Laminate base
12a Top surface
12b Bottom surface
14 Laminated sheet winding roller
16 Laminated sheet
16A First edge
16B Second edge
17 Release Sheet
17a, 18a First Surface
17b, 18b Second Surface
18, 18-1, 18-2, 18-3 Prepreg sheet
21 Support roller
22 Cutter
24, 33 Guide roller
28, 28-1, 65, 71, 81, 90 Compactor group
31 Scraper roller
35 Release sheet recovery roller
40, 73, 83 Compactor
41 Roller retaining portion
43 First rotating shaft
44 First bearing portion
46-1, 46-2, 101 First roller
46-1a, 46-2a First roller surface
51 Second rotating shaft
53 Second bearing portion
55, 103 Second roller
55a Second roller surface
57 Pressing mechanism
61, 75, 102 First roller retaining portion
61-1 Rotating shaft insertion portion
61-2 First connecting portion
62, 76, 104 Second roller retaining portion
62-1, 62-2 Rotating shaft support portion
62-3 Second connecting portion
62A, 63A Through hole
81 First pressing mechanism
81A First pressing shaft
82 Second pressing mechanism
82A Second pressing shaft
84 Pressing mechanism retaining portion
85 Rotary damper
86 Rotating shaft
91 First compactor group
92 Second compactor group
93 Connecting mechanism
95 First compactor
96 Second compactor
111 First linear guide
112 First rail
114, 121, 126, 135 Block
116 First hinge mechanism
117 Second linear guide
119 Second rail
123 Second hinge mechanism
126A, 135A Rail housing portion
127, 136 Rail
131, 132, 141, 142 Connecting member
133, 143 Hinge portion
A, C, E, G Direction
B Feed direction
F Gap
$W_1$, $W_2$, $W_3$, $W_4$ Width

The invention claimed is:

1. A prepreg sheet automatic lamination device for laminating a plurality of semi-cured prepreg sheets, the prepreg sheet automatic lamination device comprising:
a compactor group including a plurality of compactors that are arranged, each of the compactors being configured to press a laminated sheet including a release sheet and a semi-cured prepreg sheet attached to a first surface of the release sheet onto a top surface of a laminate base formed of at least one semi-cured prepreg sheet, from a second surface side of the release sheet of the laminated sheet;
a stage on which the laminate base is placed horizontally;
a laminated sheet supply roller configured to horizontally supply the laminated sheet onto the top surface of the laminate base; and a release sheet recovery roller configured to recover the release sheet peeled off from the semi-cured prepreg sheet pressed, by the compactor group, onto the top surface of the laminate base, each compactor including:

a pair of first rollers disposed separated from each other, each of the first rollers having a first roller surface that presses the laminated sheet from the second surface side of the release sheet; and a second roller having a second roller surface that presses the laminated sheet from the second surface side of the release sheet, the second roller being disposed such that the second roller surface faces a gap provided between the pair of first rollers, the compactor group being movable horizontally along the top surface of the laminate base independently from the laminated sheet supply roller and the release sheet recovery roller, wherein the plurality of compactors forming the compactor group are arranged such that the pair of first rollers and the second roller from each compactor are alternately disposed in a direction intersecting a feed direction of the laminated sheet, and the first roller surfaces that are constituents of one of the compactors are disposed so as to face the first roller surfaces of other compactors disposed adjacent to the one of the compactors.

2. The prepreg sheet automatic lamination device according to claim 1, wherein the second roller is disposed such that outer peripheral surfaces located on the gap side of the first roller surfaces of the pair of first rollers face the second roller surface.

3. The prepreg sheet automatic lamination device according to claim 1, further comprising:

a first rotating shaft configured to rotatably support the pair of first rollers;

a second rotating shaft configured to rotatably support the second roller; and a roller retaining portion configured to retain the pair of first rollers and the second roller, via the first and second rotating shafts.

4. The prepreg sheet automatic lamination device according to claim 3, wherein the roller retaining portion includes a first roller retaining portion configured to retain the pair of the first rollers, and a second roller retaining portion configured to retain the second roller, and the prepreg sheet automatic lamination device further comprises:

a first pressing air cylinder or shaft connected to an upper portion of the first roller retaining portion and configured to press the first roller retaining portion; and a second pressing air cylinder or shaft connected to an upper portion of the second roller retaining portion and configured to press the second roller retaining portion.

5. The prepreg sheet automatic lamination device according to claim 4, wherein the second roller retaining portion is provided separately from the first roller retaining portion.

6. The prepreg sheet automatic lamination device according to claim 5, further comprising a pressing mechanism retaining portion configured to retain the first pressing air cylinder or shaft and the second pressing air cylinder or shaft.

7. The prepreg sheet automatic lamination device according to claim 3, further comprising:

a rotary damper fixed on the roller retaining portion; and a rotating shaft connected to a top of the rotary damper and configured to rotatably support the roller retaining portion.

* * * * *